United States Patent
Takayama et al.

(10) Patent No.: US 10,508,212 B2
(45) Date of Patent: Dec. 17, 2019

(54) METHOD FOR FORMING MULTILAYER COATING FILM

(71) Applicant: KANSAI PAINT CO., LTD., Hyogo (JP)

(72) Inventors: Daisuke Takayama, Kanagawa (JP); Hironori Tonomura, Kanagawa (JP); Naoto Matsushima, Kanagawa (JP); Shuichi Nakahara, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 15/544,628

(22) PCT Filed: Dec. 10, 2015

(86) PCT No.: PCT/JP2015/084655
§ 371 (c)(1),
(2) Date: Aug. 3, 2017

(87) PCT Pub. No.: WO2016/121239
PCT Pub. Date: Aug. 4, 2016

(65) Prior Publication Data
US 2018/0016462 A1   Jan. 18, 2018

(30) Foreign Application Priority Data

Jan. 30, 2015   (JP) ................. 2015/016689

(51) Int. Cl.
| | | |
|---|---|---|
| C09D 133/06 | (2006.01) | |
| B05D 7/00 | (2006.01) | |
| C09D 133/12 | (2006.01) | |
| C08K 3/32 | (2006.01) | |

(52) U.S. Cl.
CPC ......... C09D 133/062 (2013.01); B05D 7/572 (2013.01); C09D 133/12 (2013.01); C08K 3/32 (2013.01)

(58) Field of Classification Search
CPC .... C09D 133/06; C09D 133/12; B05D 7/572; B32B 27/18; C08K 3/32
See application file for complete search history.

(56) References Cited

U.S. PATENT DOCUMENTS

| | | | | |
|---|---|---|---|---|
| 2,080,299 A | * | 5/1937 | Benning | C23F 11/1673 148/246 |
| 4,350,535 A | * | 9/1982 | Ishijima | C09D 17/006 106/403 |
| 4,621,112 A | * | 11/1986 | Backhouse | C09D 5/38 106/404 |
| 4,869,754 A | * | 9/1989 | Kawabe | C09C 1/644 106/404 |
| 5,466,286 A | * | 11/1995 | Briselli | C09D 5/38 106/403 |
| 6,348,528 B1 | | 2/2002 | Schlarb et al. | |
| 8,563,636 B2 | | 10/2013 | Wada et al. | |
| 8,906,507 B2 | * | 12/2014 | Campbell | B05D 7/576 428/423.1 |
| 2001/0021746 A1 | | 9/2001 | Nabavi et al. | |
| 2001/0024693 A1 | | 9/2001 | Morimoto et al. | |
| 2003/0158328 A1 | | 8/2003 | Nabavi et al. | |
| 2004/0134791 A1 | | 7/2004 | Toi et al. | |
| 2005/0154175 A1 | | 7/2005 | Nabavi et al. | |
| 2007/0191569 A1 | | 8/2007 | Nabavi et al. | |
| 2008/0131714 A1 | | 6/2008 | Toi et al. | |
| 2009/0274846 A1 | | 11/2009 | Wada et al. | |
| 2011/0111242 A1 | * | 5/2011 | Tomizaki | B05D 7/14 428/482 |

(Continued)

FOREIGN PATENT DOCUMENTS

| | | |
|---|---|---|
| JP | 2000-506195 | 5/2000 |
| JP | 2001-205175 | 7/2001 |
| JP | 2002-282773 | 10/2002 |

(Continued)

OTHER PUBLICATIONS

International Search Report dated Feb. 23, 2016 in International (PCT) Application No. PCT/2015/084655.

(Continued)

*Primary Examiner* — Francisco W Tschen
(74) *Attorney, Agent, or Firm* — Wenderoth, Lind & Ponack, L.L.P.

(57) ABSTRACT

The problem to be solved by the present invention is to provide a method for forming a multilayer coating film using a 3-coat 1-bake process, the method comprising sequentially applying an aqueous first colored coating composition, an aqueous second colored coating composition, and a clear coating composition to a substrate and simultaneously heat-curing the resulting three layers to form a multilayer coating film having excellent smoothness and distinctness of image, as well as excellent coating film performance, such as water resistance. The present invention provides a method for forming a multilayer coating film by a 3-coat 1-bake process comprising sequentially applying an aqueous first colored coating composition, an aqueous second colored coating composition, and a clear coating composition to a substrate, and simultaneously heat-curing the resulting three layers to form a multilayer coating film, wherein the aqueous first colored coating composition (X) contains (A) a film-forming resin and (B) a phosphoric acid compound represented by a specific formula.

14 Claims, No Drawings

(56) References Cited

U.S. PATENT DOCUMENTS

2014/0004365 A1  1/2014  Kitazono et al.

FOREIGN PATENT DOCUMENTS

| JP | 2004-358462 | 12/2004 |
| JP | 2007-84801 | 4/2007 |
| JP | 2013-535311 | 9/2013 |
| JP | 2014-4552 | 1/2014 |
| WO | 97/31960 | 9/1997 |
| WO | 2004/061025 | 7/2004 |
| WO | 2008/050756 | 5/2008 |
| WO | 2012/002569 | 1/2012 |

OTHER PUBLICATIONS

Office Action dated Aug. 17, 2018 in corresponding Canadian Application No. 2,974,183.

* cited by examiner

METHOD FOR FORMING MULTILAYER COATING FILM

CROSS-REFERENCE TO RELATED APPLICATION

This application claims priority to Japanese Patent application No. 2015-016689, filed on Jan. 30, 2015, the disclosure of which is incorporated herein by reference in its entirety. The present invention relates to a method of forming a multilayer coating film by a 3-coat 1-bake process that comprises sequentially applying an aqueous first colored coating composition, an aqueous second colored coating composition, and a clear coating composition to a substrate and heat-curing the resulting three layers simultaneously to form a multilayer coating film having excellent appearance.

TECHNICAL FIELD

Background Art

As methods for forming coating films on vehicle bodies, multilayer coating film-forming methods using a 3-coat 2-bake process or a 2-coat 2-bake process have been widely used. The 3-coat 2-bake process comprises the following steps in order: subjecting a substrate to electrodeposition coating and curing by heating, and then applying an intermediate coating composition, curing by heating, applying a base coating composition, preheating (preliminary heating), applying a clear coating composition, and curing by heating. The 2-coat 2-bake process comprises the following steps in order: subjecting a substrate to electrodeposition coating and curing by heating, and then applying an intermediate coating composition, curing by heating, applying a top coating composition, and curing by heating.

Generally, the 3-coat 2-bake process is used for forming a coating film of a "metallic color" by using a base coating composition comprising an effect pigment, whereas the 2-coat 2-bake process is used for forming a coating film of a "solid color," such as white or black, by using a top coating composition comprising a color pigment.

In recent years, for the purpose of saving energy, consideration has been given to omitting the heat-curing step that is performed after applying the intermediate coating composition, and research has been conducted on a 3-coat 1-bake process comprising the following steps in order: applying an intermediate coating composition, preheating (preliminary heating), applying a base coating composition, preheating (preliminary heating), applying a clear coating composition, and curing by heating (see, for example, Patent Literature (PTL) 1), and on a 2-coat 1-bake process comprising the following steps in order: applying an intermediate coating composition, preheating (preliminary heating), applying a top coating composition, and curing by heating.

From the viewpoint of minimizing environmental pollution caused by volatilization of organic solvents, particular demand exists for a 3-coat 1-bake process or a 2-coat 1-bake process using aqueous coating compositions as the intermediate coating composition, base coating composition, and top coating composition.

In coating vehicle exterior panels, the 3-coat 1-bake process is also required to form a coating film of a high-grade design that is equivalent to or higher than conventional coating films.

However, in the 3-coat 1-bake process, a mixed layer is easily formed between the intermediate coating film and the base coating film, which often results in reduction in smoothness or distinctness of image of the obtained coating film, as well as poor anti-chipping properties, which is presumably due to a change in curing balance associated with curing agent migration at the interface of the coating films, and low water resistance of the resulting coating film, which is presumably due to the use of a water-soluble or water-dispersible resin.

Patent Literature (PTL) 2 discloses a method for forming a laminated coating film, the method comprising successively forming on an electrocoated substrate an intermediate coating film of an aqueous intermediate coating composition, a metallic base coating film of an aqueous metallic base coating composition, and a clear coating film of a clear coating composition. In relation to this method, PTL 2 discloses that when the water-based intermediate coating composition comprises an aqueous dispersion of amide-group-containing acrylic resin particles with a particle size of 0.01 to 1.0 μm, which is obtained by emulsion polymerization of an amide-group-containing ethylenically unsaturated monomer and another ethylenically unsaturated monomer, bleeding or inversion at the interface of coating film layers can be controlled, and a laminated coating film of excellent appearance can be thus formed. The multilayer film obtained by this coating-film-forming method, however, occasionally has insufficient smoothness.

Patent Literature (PTL) 3 discloses a method for forming a multilayer coating film, the method comprising (1) providing an electrocoated substrate; (2) applying an aqueous intermediate coating composition to the electrodeposition coating film to form an intermediate coating film; (3) sequentially applying an aqueous base coating composition and a clear coating composition to the intermediate coating film by a wet-on-wet process without curing the intermediate coating film to form a base coating film and a clear coating film; and (4) simultaneously curing by baking the intermediate coating film, base coating film, and clear coating film. In relation to this method, PTL 3 discloses that when the aqueous intermediate coating composition contains a specific acrylic resin emulsion and urethane resin emulsion, and also when the intermediate coating film formed from the aqueous intermediate coating composition has a specific water absorption rate and water elution rate, the formation of a mixed layer between the intermediate coating film and base coating film is effectively prevented, and that a multilayer coating film having excellent surface smoothness can thereby be formed. However, the multilayer coating film obtained by using this multilayer-film-forming method also occasionally had insufficient smoothness and distinctness of image.

Patent Literature (PTL) 4 discloses an aqueous intermediate coating composition comprising a copolymer resin emulsion and a curing agent, the copolymer resin emulsion being obtained by emulsion polymerization of the following: monomer (a) comprising at least one monomer selected from alkyl(meth)acrylates and, if necessary, at least one monomer selected from the group consisting of styrene monomer, (meth)acrylonitrile and (meth)acrylamide; an acid group-containing polymerizable unsaturated monomer (b); a hydroxy group-containing polymerizable unsaturated monomer (c); and a crosslinkable monomer (d), the resin having a glass transition temperature of −50° C. to 20° C., an acid value of 2 to 60 mgKOH/g and a hydroxy value of 10 to 120 mgKOH/g. Patent Literature (PTL) 4 discloses that when this aqueous composition is used as an intermediate coating composition in a 3-coat-1-bake process, curing reactability of the copolymer resin emulsion with the curing agent is enhanced to thereby enable the formation of a multilayer coating film with good chipping resistance and water resistance, as well as good finished appearance. However, the multilayer coating film obtained by this multilayer-coating film-forming process also occasionally had insufficient smoothness and distinctness of image.

CITATION LIST

Patent Literature

PTL 1: JP2002-282773A
PTL 2: JP2001-205175A
PTL 3: JP2004-358462A
PTL 4: WO2004/061025

SUMMARY OF INVENTION

Technical Problem

An object of the present invention is to provide a method capable of forming a multilayer coating film by a 3-coat 1-bake process comprising sequentially applying an aqueous first colored coating composition, an aqueous second colored coating composition, and a clear coating composition to a substrate, and heat-curing the resulting three layers of the multilayer coating film simultaneously, the obtained multilayer coating film having excellent smoothness and distinctness of image and exhibiting excellent excellent coating film performance such as water resistance.

Solution to Problem

The present inventors conducted extensive research to achieve the above object, and as a result, found that the object can be achieved by using a multilayer film formation method that employs a 3-coat 1-bake process comprising: sequentially applying an aqueous first colored coating composition, an aqueous second colored coating composition, and a clear coating composition on a substrate; and heat-curing the resulting three layers of the multilayer coating film simultaneously, wherein the aqueous first colored coating composition (X) comprises (A) a film-forming resin and (B) a phosphoric acid compound represented by a specific formula. The present invention has been accomplished based on this finding.

The present invention provides a method for forming a multilayer coating film, comprising subjecting a substrate to the following steps (1) to (4) in order:
step (1): applying an aqueous first colored coating composition (X) to form a first colored coating film,
step (2): applying an aqueous second colored coating composition (Y) to the first colored coating film formed in step (1) to form a second colored coating film,
step (3): applying a clear coating composition (Z) to the second colored coating film formed in step (2) to form a clear coating film; and
step (4): simultaneously bake-curing the first colored coating film, the second colored coating film, and the clear coating film formed in steps (1) to (3),
wherein an aqueous coating composition comprising (A) a film-forming resin and (B) a phosphoric acid compound is applied as the aqueous first colored coating composition (X), the phosphoric acid compound (B) being a phosphoric acid compound represented by the formula:

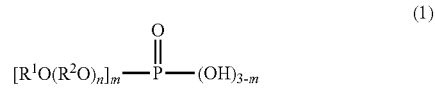

(wherein m is 1 or 2, n is 0 or an integer of 1 to 20, and $R^1$ is a substituted or unsubstituted hydrocarbon group having 2 to 20 carbon atoms,
when m is 2, each $R^1$ may be the same or different, and $R^2$ is alkylene having 2 to 4 carbon atoms,
when n is 2 or more, n oxyalkylene units ($R^2O$) may be the same or different, and
when m is 2, each $(R^2O)_n$ may be the same or different).

The present invention further provides an aqueous first colored coating composition for use in the multilayer coating film formation method.

The present invention further provides an article coated by the multilayer coating film formation method.

Advantageous Effects of Invention

The method for forming a multilayer coating film of the present invention uses a 3-coat 1-bake process comprising sequentially applying an aqueous first colored coating composition, an aqueous second colored coating composition, and a clear coating composition to a substrate and simultaneously heat-curing the three layers of the resulting multilayer forming film, the aqueous second colored coating composition comprises (A) a film-forming resin and (B) a phosphoric acid compound represented by a specific formula. In particular, the main characteristic is that the aqueous second colored coating composition comprises a phosphoric acid compound (B) as a component that serves as a surfactant and a curing catalyst.

The phosphoric ester compound used as component (B) is a compound having a phosphate group and a hydrocarbon group, and preferably further having a (poly)oxyalkylene group. Because of such a molecular structure, this compound has the action as an acid compound derived from the phosphate group, and also has the action as a surfactant due to the combined use of the phosphate group, which is a hydrophilic group (and preferably a (poly)oxyalkylene group, which is a nonionic group), and the hydrocarbon group, which is a hydrophobic group.

Owing to the specific feature of the phosphoric acid compound (B), the first colored coating film formed by the multilayer coating film formation method of the present invention using an aqueous first colored coating composition comprising (A) a film-forming resin and (B) a phosphoric acid compound as constituents has wettability, viscosity development, and like effects, and inhibits the formation of a mixed layer between the coating film layers. Therefore, the resulting multilayer coating film has excellent finished appearance (smoothness and distinctness of image).

Further, the effect of the phosphate group in the phosphoric acid compound (B) improves curability and adhesion of the resulting coating film. Therefore, a multilayer coating film with excellent coating film performance, such as water resistance, can be obtained.

DESCRIPTION OF EMBODIMENTS

The method for forming a multilayer coating film of the present invention is described in more detail below, sequentially following each step.

Step (1)

According to the method for forming a multilayer coating film of the present invention, an aqueous first colored coating composition (X) is first applied to a substrate.
Substrate The substrate to which the aqueous first colored coating composition (X) of the present invention can be applied is not particularly limited. Examples include exterior panels of vehicle bodies, such as automobiles, trucks, motorcycles, and buses; automobile parts such as bumpers; exterior panels of home appliances, such as mobile phones and audio equipment; etc. Of these, exterior panels of vehicle bodies and automobile parts are preferable.

The base materials that constitute these substrates are not particularly limited. Examples include iron, aluminum, brass, copper, stainless steel, tin, galvanized steel, alloyed zinc (Zn—Al, Zn—Ni, Zn—Fe, etc.)-plated steel, and like metal plates; plastic materials, such as resins (e.g., polyethylene resin, polypropylene resin, acrylonitrile-butadiene-styrene (ABS) resin, polyamide resin, acrylic resin, vinylidene chloride resin, polycarbonate resin, polyurethane resin, and epoxy resin) and various types of FRPs; inorganic materials, such as glass, cement, and concrete; lumber; fibrous materials, such as paper and cloth; and the like. Of these, metal plates and plastic materials are preferable.

The substrate to be coated may be a metal material as described above or a metal body formed from such a metal material, such as a vehicle body, which may be subjected to a surface treatment, such as phosphate treatment, chromate treatment, or composite oxide treatment, and which may be further coated with a coating film.

Examples of a substrate having a coating film formed thereon include base materials that are optionally surface-treated and that have an undercoating film formed thereon. The undercoating film is formed for the purpose of imparting anticorrosion, tight adhesion of a subsequent coating film to the base material, and masking properties for the unevenness of the base material surface (also referred to as "substrate masking properties"). As undercoating compositions for forming such an undercoating film, those that are themselves known can be used. For example, cationic or anionic electrodeposition coating compositions are preferably applied to conductive base materials, such as metals. Chlorinated polyolefin-resin-based coating compositions or the like are preferably applied to low-polarity base materials, such as polypropylene.

The substrate may be, for example, a plastic material as mentioned above or a plastic member formed from such a plastic material, such as a vehicle component, which may be optionally surface-treated or coated with a primer. Alternatively, the substrate may be a combination of such a plastic material and a metallic material as mentioned above.

After the application, the undercoating composition may be cured by heating, blowing, or like means, or may be dried to an extent not causing curing. When a cationic or anionic electrodeposition coating composition is used as the undercoating composition, the undercoating composition is preferably cured by heating after applying the undercoating composition so as to prevent the formation of a mixed layer between the undercoating film and a coating film sequentially famed on the undercoating film and to form a multilayer coating film of excellent appearance.
Aqueous First Colored Coating Composition (X)

The aqueous first colored coating composition (X) is an aqueous coating composition containing:
(A) a film-forming resin and
(B) a phosphoric acid compound represented by the formula

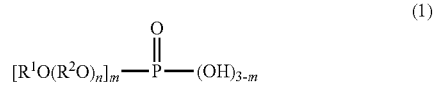

(wherein m is 1 or 2, n is 0 or an integer of 1 to 20, and $R^1$ is a substituted or unsubstituted hydrocarbon group having 2 to 20 carbon atoms,
when m is 2, each $R^1$ may be the same or different,
$R^2$ is alkylene having 2 to 4 carbon atoms,
when n is 2 or more, n oxyalkylene units ($R^2O$) may be the same or different, and
when m is 2, each $(R^2O)_n$ may be the same or different).

The aqueous first colored coating composition (X) is generally applied for the purpose of providing adhesion to a substrate and imparting functions such as smoothness and chipping resistance to the substrate.

"Aqueous coating composition" used herein is a term used in contrast to "organic-solvent-based coating composition." In general, this term refers to a coating composition in which a coating film-forming resin, a pigment, etc. are dispersed and/or dissolved in water, or in a medium mainly consisting of water (aqueous medium).
Film-Forming Resin (A)

Examples of the film-forming resin (A) include known resins commonly used in coating compositions, such as acrylic resin, polyester resin, urethane-modified polyester resin, epoxy resin, and polyurethane resin.

Among these, acrylic resin, polyester resin, and polyurethane resin can be preferably used.

These resins preferably contain a crosslinkable functional group, such as hydroxyl, carboxyl, or epoxy, and particularly preferably contain a hydroxyl group.

In terms of the finished appearance of the resulting multilayer coating film and coating film performance such as water resistance, the film-forming resin (A) of the aqueous first colored coating composition (X) used in the method of the present invention preferably contains acrylic resin particles (A1) synthesized in the form of particles.
Acrylic Resin Particles (A1)

Acrylic resin particles (A1) can be synthesized by a standard method, for example, by copolymerizing a polymerizable unsaturated monomer by emulsion polymerization in water, mini-emulsion polymerization in water, suspension polymerization, or the like.

Acrylic resin particles (A1) preferably have a hydroxyl group as a crosslinking functional group, in terms of coating resin compositions generally widely used as coating compositions (e.g., acrylic melamine resin, acrylic isocyanate resin, etc.).

Examples of polymerizable unsaturated monomers include the following monomers (i) to (xx). These polymerizable unsaturated monomers can be used singly or in a combination of two or more.

(i) Compounds having one or more hydroxyl groups and one or more polymerizable unsaturated groups per molecule: for example, monoesterified products of (meth)acrylic acid with a dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone modified products of such monoesterified products of (meth)acrylic acid with a dihydric alcohol having 2 to 8 carbon atoms; N-hydroxymethyl (meth)acrylamide; allyl alcohol; (meth)acrylates that include a hydroxy-terminated polyoxyethylene chain; etc. (provided that, in the present invention, monomers corresponding to (xviii) polymerizable unsaturated monomers having a UV-absorbing functional group, described later, are excluded from the compounds having one or more hydroxyl groups and one or more polymerizable unsaturated groups per molecule specified in (i) above).

(ii) Alkyl or cycloalkyl (meth)acrylates: for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, tricyclodecanyl (meth)acrylate, etc.

(iii) Isobornyl-containing polymerizable unsaturated monomers: isobornyl (meth)acrylate, etc.

(iv) Adamanthyl-containing polymerizable unsaturated monomers: adamanthyl (meth)acrylate, etc.

(v) Tricyclodecenyl-containing polymerizable unsaturated monomers: tricyclodecenyl (meth)acrylate, etc.

(vi) Aromatic ring-containing polymerizable unsaturated monomers: benzyl (meth)acrylate, styrene, α-methylstyrene, vinyl toluene, etc.

(vii) Alkoxysilyl-containing polymerizable unsaturated monomers: vinyltrimethoxysilane, vinyltriethoxysilane, vinyltris(2-methoxyethoxy)silane, γ-(meth)acryloyloxypropyl trimethoxysilane, γ-(meth)acryloyloxypropyl triethoxysilane, etc.

(viii) Polymerizable unsaturated monomers having a fluorinated alkyl group: perfluoroalkyl (meth)acrylates, such as perfluorobutylethyl (meth)acrylate and perfluorooctylethyl (meth)acrylate; fluoroolefin; etc.

(ix) Polymerizable unsaturated monomers having a photopolymerizable functional group, such as a maleimide group.

(x) Vinyl compounds: N-vinyl pyrrolidone, ethylene, butadiene, chloroprene, vinyl propionate, vinyl acetate, etc.

(xi) Carboxy-containing polymerizable unsaturated monomers: (meth)acrylic acid, maleic acid, crotonic acid, β-carboxyethyl acrylate, etc.

(xii) Nitrogen-containing polymerizable unsaturated monomers: (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylenebis (meth)acrylamide, ethylenebis (meth)acrylamide, adducts of glycidyl (meth)acrylate with amine compounds, etc.

(xiii) Polymerizable unsaturated monomers having two or more polymerizable unsaturated groups per molecule: allyl (meth)acrylate, 1,6-hexanediol di(meth)acrylate, etc.

(xiv) Epoxy-containing polymerizable unsaturated monomers: glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, etc.

(xv) (Meth)acrylates having an alkoxy-terminated polyoxyethylene chain.

(xvi) Sulfonic acid group-containing polymerizable unsaturated monomers: 2-acrylamide-2-methylpropanesulfonic acid, 2-sulfoethyl (meth)acrylate, allylsulfonic acid, and 4-styrenesulfonic acid; sodium salts and ammonium salts of such sulfonic acids; etc.

(xvii) Phosphate group-containing polymerizable unsaturated monomers: acid phosphoxyethyl (meth)acrylate, acid phosphoxypropyl (meth)acrylate, acid phosphoxypoly(oxyethylene) glycol (meth)acrylate, acid phosphoxypoly(oxypropylene) glycol (meth)acrylate, etc.

(xviii) Polymerizable unsaturated monomers having a UV-absorbing functional group: 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole, etc.

(xix) UV-stable polymerizable unsaturated monomers: 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, etc.

(xx) Carbonyl-containing polymerizable unsaturated monomers: acrolein, diacetone acrylamide, diacetone methacrylamide, acetoacetoxylethyl methacrylate, formylstyrol, $C_4$-$C_7$ vinyl alkyl ketones (e.g., vinyl methyl ketone, vinyl ethyl ketone, and vinyl butyl ketone), etc.

In this specification, a polymerizable unsaturated group means an unsaturated group that can undergo radical polymerization. Examples of such polymerizable unsaturated groups include vinyl, (meth)acryloyl, and the like.

The term "(meth)acrylate" used herein means acrylate or methacrylate. The term "(meth)acrylic acid" means acrylic acid or methacrylic acid. The term "(meth)acryloyl" means acryloyl or methacryloyl. The term "(meth)acrylamide" means acrylamide or methacrylamide.

When the acrylic resin particles (A1) have a hydroxyl group, the hydroxy value is preferably 1 to 200 mgKOH/g, more preferably 3 to 150 mgKOH/g, and even more preferably 5 to 100 mgKOH/g, in terms of the curability and water resistance of the resulting coating film, etc.

When the acrylic resin particles (A1) have an acid group, the acid value is preferably 50 mgKOH/g or less, more preferably 0.1 to 30 mgKOH/g, and even more preferably 1 to 20 mgKOH/g, in terms of the storage stability of the coating composition, smoothness, distinctness of image, water resistance, etc.

The amount of the acrylic resin particles (A1) is preferably 2 to 95 mass %, more preferably 10 to 75 mass %, and even more preferably 15 to 60 mass %, based on the total solids content of the acrylic resin (A1).

The acrylic resin particles (A1) preferably have a core/shell structure, in terms of viscosity development imparted to the coating composition, the water resistance of the resulting coating film, etc.

A suitable example of the core/shell type acrylic resin particles (A1) is core/shell type hydroxy-containing acrylic resin particles (A1-1) having a core portion that is a copolymer (I) comprising, as copolymer components, a polymerizable unsaturated monomer having two or more polymerizable unsaturated groups per molecule and a polymerizable unsaturated monomer having one polymerizable unsaturated group per molecule, and a shell portion that is a copolymer (II) comprising, as copolymer components, a hydroxy-containing polymerizable unsaturated monomer, a carboxy-containing polymerizable unsaturated monomer, and other polymerizable unsaturated monomers.

Examples of the polymerizable unsaturated monomer having two or more polymerizable unsaturated groups per molecule include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-tris-hydroxymethylethane di(meth)acrylate, 1,1,1-tris-hydroxymethylethane tri(meth)acrylate, 1,1,1-tris-hydroxymethylpropane tri(meth)acrylate, triallyl isocyanurate, diallyl terephthalate, divinylbenzene, methylenebis (meth)acrylamide, ethylenebis (meth)acrylamide, and the like. These monomers can be used singly or in a combination of two or more.

The polymerizable unsaturated monomer having two or more polymerizable unsaturated groups per molecule functions to provide a crosslinked structure to the core copolymer (I). The amount of the polymerizable unsaturated monomer having two or more polymerizable unsaturated groups per molecule can be suitably determined according to the degree of crosslinking of the core copolymer (I). The amount thereof is generally preferably 0.1 to 30 mass %, more preferably 0.5 to 10 mass %, and still more preferably 1 to 7 mass %, based on the total mass of the monomers constituting the core copolymer (I).

Specific examples of the polymerizable unsaturated monomer having one polymerizable unsaturated group per molecule include, for example, among the polymerizable unsaturated monomers listed above, monomers (i) to monomers (xii), monomers (xiv) to monomers (xx), etc. that are polymerizable unsaturated monomers other than the polymerizable unsaturated monomers having two or more polymerizable unsaturated groups per molecule. These monomers can be used singly or in a combination of two or more according to the properties required of the core/shell type hydroxy-containing acrylic resin particles (A1-1).

Of these, in terms of the smoothness and distinctness of image of the resulting coating film, etc., it is preferable that at least one of the polymerizable unsaturated monomers having one polymerizable unsaturated group per molecule be a hydrophobic polymerizable unsaturated monomer.

In this specification, the hydrophobic polymerizable unsaturated monomer is a polymerizable unsaturated monomer having a linear, branched, or cyclic saturated or unsaturated hydrocarbon group having 4 or more carbon atoms, preferably 6 to 18 carbon atoms; and monomers having a hydrophilic group, such as hydroxy-containing polymerizable unsaturated monomers, are excluded therefrom. Examples of such monomers include alkyl or cycloalkyl (meth)acrylates, such as n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, and tricyclodecanyl (meth)acrylate; isobornyl-containing polymerizable unsaturated compounds, such as isobornyl (meth)acrylate; adamantyl-containing polymerizable unsaturated compounds, such as adamantyl (meth)acrylate; aromatic ring-containing polymerizable unsaturated monomers, such as benzyl (meth)acrylate, styrene, α-methylstyrene, and vinyl toluene; and the like. These monomers can be used singly or in a combination of two or more.

Of these, at least one polymerizable unsaturated monomer selected from the group consisting of n-butyl (meth)acrylate, 2-ethylhexyl (meth)acrylate, and styrene can be preferably used as the hydrophobic polymerizable unsaturated monomer, in terms of the distinctness of image etc. of the resulting coating film.

When a hydrophobic polymerizable unsaturated monomer mentioned above is used as a monomer for the core copolymer (I), the amount of the hydrophobic polymerizable unsaturated monomer is preferably 5 to 90 mass %, based on the total mass of the monomers constituting the core copolymer (I), in terms of the excellent stability of the core/shell type hydroxy-containing acrylic resin particles (A1) in an aqueous medium, the excellent smoothness and distinctness of image of the resulting coating film, etc.

The shell copolymer (II) comprises, as copolymer components, a hydroxy-containing polymerizable unsaturated monomer, an acid group-containing polymerizable unsaturated monomer, and other polymerizable unsaturated monomers.

The hydroxy-containing polymerizable unsaturated monomer used as a monomer for the shell copolymer (II) introduces, into the obtained core/shell type hydroxy-containing acrylic resin particles (A1-1), a hydroxyl group that can be crosslinked with a crosslinking agent (e.g., melamine resin, polyisocyanate compound, etc.) contained in coating resin compositions generally widely used as coating compositions (e.g., acrylic melamine resin, acrylic isocyanate resin, etc.), and thereby functions to enhance the water resistance etc. of the coating film and to enhance the stability of the core/shell type hydroxy-containing acrylic resin particles (A1-1) in an aqueous medium.

Examples of the hydroxy-containing polymerizable unsaturated monomer include monoesterified products of (meth)acrylic acid with a dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone modified products of such monoesterified products of (meth)acrylic acid with a dihydric alcohol having 2 to 8 carbon atoms; N-hydroxymethyl (meth)acrylamide; allyl alcohol; (meth)acrylates that include a hydroxy-terminated polyoxyethylene chain; etc.

Such monomers can be used singly or in a combination of two or more. Preferable examples of the hydroxy-containing polymerizable unsaturated monomer include 2-hydroxyethyl (meth)acrylate, 2-hydroxypropyl (meth)acrylate, 3-hydroxypropyl (meth)acrylate, and 4-hydroxybutyl (meth)acrylate; among these, 2-hydroxyethyl (meth)acrylate can be particularly preferably used.

The amount of the hydroxy-containing polymerizable unsaturated monomer is preferably 1 to 40 mass %, more preferably 4 to 25 mass %, and even more preferably 7 to 19 mass %, based on the total mass of the monomers constituting the shell copolymer (II).

Specific examples of the carboxy-containing polymerizable unsaturated monomer used as a monomer for the shell copolymer (II) include the carboxy-containing polymerizable unsaturated monomers (xi) among the polymerizable unsaturated monomers listed above as examples of the polymerizable unsaturated monomer. Among these, it is preferable to use acrylic acid and/or methacrylic acid. The use of the carboxy-containing polymerizable unsaturated monomer in the shell portion can improve the stability of the resulting core/shell type hydroxy-containing acrylic resin particles (A1-1) in an aqueous medium.

The amount of the carboxy-containing polymerizable unsaturated monomer used is preferably 0.1 to 30 mass %, more preferably 2 to 25 mass %, and even more preferably 3 to 19 mass %, based on the total mass of the monomers constituting the shell copolymer (II), in terms of the excellent stability of the resulting core/shell type hydroxy-containing acrylic resin particles (A1-1) in an aqueous medium.

The other polymerizable unsaturated monomers used as monomers for the shell copolymer (II) are polymerizable unsaturated monomers other than the hydroxy-containing polymerizable unsaturated monomers and carboxy-containing polymerizable unsaturated monomers mentioned above. Examples of such monomers include alkyl or cycloalkyl (meth)acrylates, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, dodecyl (meth)acrylate, tridecyl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, and tricyclodecanyl (meth)acrylate; isobornyl-containing polymerizable unsaturated compounds, such as isobornyl (meth)acrylate; adamantyl-containing polymerizable unsaturated compounds, such as adamantyl (meth)acrylate; and aromatic ring-containing polymerizable unsaturated monomers, such as benzyl (meth)acrylate, styrene, α-methylstyrene, and vinyl toluene; and the like. These monomers can be used singly or in a combination of two or more.

In terms of improving the finished appearance of the resulting coating film, it is preferable not to use polymerizable unsaturated monomers having two or more polymerizable unsaturated groups per molecule as the other polymerizable unsaturated monomers used as monomers for the shell copolymer (II), thus forming an uncrosslinked copolymer (II).

In terms of improving the distinctness of image and luster of the resulting coating film, the ratio of the copolymer (I) to the copolymer (II) in the core/shell type hydroxy-containing acrylic resin particles (A1-1) is preferably in the range of 5/95 to 95/5, more preferably 50/50 to 85/15, and even more preferably 60/40 to 80/20, on a solids basis.

In terms of the excellent curability of the coating composition, the excellent water resistance of the resulting coating film, etc., the hydroxy value of the core/shell type hydroxy-containing acrylic resin particles (A1-1) is preferably in the range of 1 to 200 mgKOH/g, more preferably 3 to 150 mgKOH/g, and even more preferably 5 to 100 mgKOH/g.

In terms of improving the storage stability of the coating composition, and the smoothness and distinctness of image of the resulting coating film, the acid value of the core/shell type hydroxy-containing acrylic resin particles (A1-1) is preferably in the range of 40 mgKOH/g or less, more preferably 0.1 to 30 mgKOH/g, and even more preferably 1 to 20 mgKOH/g.

The amount of the core/shell type hydroxy-containing acrylic resin particles (A1-1) in the aqueous first colored coating composition (X) used in the method of the present invention is preferably 2 to 95 mass %, more preferably 10 to 75 mass %, and even more preferably 15 to 60 mass %, based on the total solids content of the film-forming resin (A).

The core/shell type hydroxy-containing acrylic resin particles (A1-1) can be synthesized, for example, by subjecting to emulsion polymerization a monomer mixture of 0.1 to 30 mass % of a polymerizable unsaturated monomer having two or more polymerizable unsaturated groups per molecule, and 70 to 99.9 mass % of a polymerizable unsaturated monomer having one polymerizable unsaturated group per molecule to form an emulsion of a core copolymer (I); adding to this emulsion a monomer mixture of 1 to 40 mass % of a hydroxy-containing polymerizable unsaturated monomer, 0.1 to 30 mass % of a carboxy-containing polymerizable unsaturated monomer, and 30 to 98.9 mass % of other polymerizable unsaturated monomers; and further performing emulsion polymerization to form a shell copolymer (II).

The emulsion polymerization for preparing an emulsion of the core copolymer (I) can be performed according to a known method. Specifically, the emulsion can be prepared by subjecting the monomer mixture to emulsion polymerization using a polymerization initiator in the presence of a surfactant.

For the surfactant, anionic surfactants and nonionic surfactants are suitable. Examples of anionic surfactants include sodium salts and ammonium salts of alkylsulfonic acids, alkylbenzenesulfonic acids, alkylphosphoric acids, etc. Examples of nonionic surfactants include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate, etc.

Other examples of usable surfactants include polyoxyalkylene-containing anionic surfactants that have an anionic group and a polyoxyalkylene group, such as polyoxyethylene or polyoxypropylene, per molecule; and reactive anionic surfactants that have an anionic group and a radically polymerizable unsaturated group per molecule. Among these, reactive anionic surfactants are preferable.

Examples of reactive anionic surfactants include sodium salts of sulfonic acid compounds having a radically polymerizable unsaturated group, such as allyl, methallyl, (meth)acryloyl, propenyl, or butenyl; ammonium salts of such sulfonic acid compounds; and the like. Among these, ammonium salts of sulfonic acid compounds having a radically polymerizable unsaturated group are preferable in teams of the excellent water resistance of the resulting coating film. Examples of commercially available ammonium salts of such sulfonic acid compounds include "LATEMUL S-180A" (trade name, produced by Kao Corporation).

Among the above ammonium salts of sulfonic acid compounds having a radically polymerizable unsaturated group, ammonium salts of sulfonic acid compounds having a radically polymerizable unsaturated group and a polyoxyalkylene group are more preferable. Commercially available ammonium salts of sulfonic acid compounds having a radically polymerizable unsaturated group and a polyoxyalkylene group include "Aqualon KH-10" (trade name, produced by Dai-Ichi Kogyo Seiyaku Co., Ltd.), "LATEMUL PD-104" (trade name, produced by Kao Corporation), "Adeka Reasoap SR-1025" (trade name, produced by ADEKA Co., Ltd.), etc.

The amount of the surfactant used is preferably in the range of 0.1 to 15 mass %, more preferably 0.5 to 10 mass %, and even more preferably 1 to 5 mass %, based on the total amount of all of the monomers used.

Examples of polymerization initiators include organic peroxides, such as benzoyl peroxide, octanoyl peroxide, lauroyl peroxide, stearoyl peroxide, cumene hydroperoxide, tert-butyl peroxide, di-tert-amyl peroxide, tert-butyl peroxy- 2-ethylhexanoate, tert-butyl peroxylaurate, tert-butyl peroxyisopropylcarbonate, tert-butylperoxyacetate, and diisopropylbenzene hydroperoxide; azo compounds, such as azobisisobutyronitrile, azobis(2,4-dimethylvaleronitrile), azobis(2-methylpropionenitrile), azobis(2-methylbutyronitrile), 4,4'-azobis(4-cyanobutanoic acid), dimethyl azobis(2-methylpropionate), azobis[2-methyl-N-(2-hydroxyethyl)-propionamide], and azobis{2-methyl-N-[2-(1-hydroxybutyl)]-propionamide}; persulfates, such as potassium persulfate, ammonium persulfate, and sodium persulfate; and the like. These polymerization initiators can be used singly or in a combination of two or more.

Redox initiators prepared by combining a polymerization initiator mentioned above with a reducing agent, such as sugar, sodium formaldehyde sulfoxylate, or iron complex, may also be used.

The amount of the polymerization initiator used is generally preferably in the range of 0.1 to 5 mass %, and particularly preferably 0.2 to 3 mass %, based on the total mass of all of the monomers used. The method of adding the polymerization initiator is not particularly limited, and can be suitably selected according to the type, amount, etc., of polymerization initiator. For example, the polymerization initiator may be incorporated into a monomer mixture or an aqueous medium beforehand, or may be added all at once or dropwise at the time of polymerization.

The core/shell type hydroxy-containing acrylic resin particles (A1-1) can be obtained by adding a monomer mixture of a hydroxy-containing polymerizable unsaturated monomer, a carboxy-containing polymerizable unsaturated monomer, and other polymerizable unsaturated monomers to the emulsion of the core copolymer (I) obtained above; and further performing polymerization to form a shell copolymer (II).

The monomer mixture for forming the shell copolymer (II) may optionally contain other components, such as a polymerization initiator mentioned above, a chain transfer agent, a reducing agent, and a surfactant. The monomer mixture is preferably added dropwise as a monomer emulsion obtained by dispersing the monomer mixture into an aqueous medium, although it may be added dropwise as is.

The polymerization of the monomer mixture for forming the shell copolymer (II) is performed, for example, by adding the monomer mixture or emulsion thereof to the emulsion of the core copolymer (I) all at once or dropwise within a predetermined time, and heating the mixture to a suitable temperature while stirring. The core/shell type hydroxy-containing acrylic resin particles (A1) thus obtained have a core/shell structure comprising a core copolymer (I) of a monomer mixture of a polymerizable unsaturated monomer having two or more polymerizable unsaturated groups per molecule and a polymerizable unsaturated monomer having one polymerizable unsaturated group per molecule, and a shell copolymer (II) of a monomer mixture of a hydroxy-containing polymerizable unsaturated monomer, a carboxy-containing polymerizable unsaturated monomer, and other polymerizable unsaturated monomers.

Moreover, the core/shell type hydroxy-containing acrylic resin particles (A1-1) may be a hydroxy-containing acrylic resin having three or more layers obtained by adding, between the step of obtaining the core copolymer (I) and the step of obtaining the shell copolymer (II), a step of supplying one or a mixture of two or more polymerizable unsaturated monomers that form one or more other resin layers, and performing emulsion polymerization.

In the aqueous first colored coating composition (X) used in the method of the present invention, the "shell portion" of the core/shell type hydroxy-containing acrylic resin particles (A1) refers to a polymeric layer present as the outermost layer of the resin particles, the "core portion" refers to a polymeric layer inside the resin particles other than the shell portion, and the "core/shell type structure" means a structure having the core portion and the shell portion.

The core/shell structure is generally a layered structure in which the core portion is completely covered by the shell portion. However, depending on the mass ratio of the core portion to the shell portion, etc., the monomer amount in the shell portion may be insufficient for forming a layered structure. In that case, a complete layered structure as described above is not necessary. A structure in which the shell portion partially covers the core portion may be selected. The concept of the multilayer structure in the above core/shell type structure also applies to a case in which the core portion of the core/shell type hydroxy-containing acrylic resin particles (A1-1) has a multilayer structure.

The acrylic resin particles (A) generally have an average particle size of 10 to 1,000 nm, preferably 20 to 500 nm, and more preferably 50 to 300 nm, in terms of the stability of the coating composition, and the smoothness and distinctness of image of the resulting coating film.

In this specification, the average particle size of the resin particles refers to a value obtained by measurement at 20° C. using a submicron particle size distribution analyzer after dilution with deionized water according to a usual method. For example, a "COULTER N4" (trade name, produced by Beckman Coulter, Inc.) may be used as the submicron particle size distribution analyzer.

The solids concentration of the acrylic resin particles (A1) in a water dispersion is preferably 20 to 50 mass %, and more preferably 30 to 40 mass %. If the solids concentration exceeds 50 mass %, emulsification is difficult, and a water dispersion may be difficult to obtain. If the solids concentration is less than 20 mass %, the concentration is low, and thus the solvent (mainly water) components increase. Accordingly, for example, it may be difficult to use the acrylic resin particles (A1) as a constituent of the aqueous coating composition.

To improve the mechanical stability of the acrylic resin particles (A), acid groups such as carboxyl groups of the water-dispersible acrylic resin are preferably neutralized with a neutralizing agent.

The neutralizing agent is not particularly limited, as long as it can neutralize acid groups. Examples of such neutralizing agents include basic compounds, such as sodium hydroxide, potassium hydroxide, trimethylamine, 2-(dimethylamino)ethanol, 2-amino-2-methyl-1-propanol, triethylamine, and aqueous ammonia.

Such a neutralizing agent is preferably used in an amount such that the pH of the water dispersion of the acrylic resin particles (A) after neutralization is 6.5 to 9.0.

The film-forming resin (A) of the aqueous first colored coating composition (X) used in the method of the present invention may further contain the following water-soluble acrylic resin (A2), polyester resin (A3), and polyurethane resin (A4), if necessary.

Water-Soluble Acrylic Resin (A2)

Different from the acrylic resin particles (A1), which are synthesized in the form of particles in a dispersion medium, such as water, the water-soluble acrylic resin (A2) is an acrylic resin that can take an aqueous form by being dissolved and dispersed in water by a water-dispersible group, such as a hydrophilic group.

Therefore, the water-soluble acrylic resin (A2) generally has a water-dispersible group, such as an acid group.

The water-soluble acrylic resin (A2) can be synthesized by, for example, copolymerizing a water-dispersible group-containing polymerizable unsaturated monomer and another polymerizable unsaturated monomer that is copolymerizable with the water-dispersible group-containing polymerizable unsaturated monomer by a general method, such as solution polymerization in an organic solvent.

As another polymerizable unsaturated monomer that is copolymerizable with the water-dispersible group-containing polymerizable unsaturated monomer, for example, the following monomers (i) to (xx) can be used, as with the acrylic resin particles (A1). These polymerizable unsaturated monomers can be used singly or in a combination of two or more.

(i) Compounds having one or more hydroxyl groups and one or more polymerizable unsaturated groups per molecule: for example, monoesterified products of (meth)acrylic acid with a dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone modified products of such monoesterified products of (meth)acrylic acid with a dihydric alcohol having 2 to 8 carbon atoms; N-hydroxymethyl (meth)acrylamide; allyl alcohol; (meth)acrylates that include a hydroxy-terminated polyoxyethylene chain; etc. (provided that, in the present invention, monomers corresponding to (xviii) polymerizable unsaturated monomers having a UV-absorbing functional group, described later, are excluded from the compounds having one or more hydroxyl groups and one or more polymerizable unsaturated groups per molecule specified in (i) above).

(ii) Alkyl or cycloalkyl (meth)acrylates: for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, tricyclodecanyl (meth)acrylate, etc.

(iii) Polymerizable unsaturated monomers having an isobornyl group: isobornyl (meth)acrylate, etc.

(iv) Adamanthyl-containing polymerizable unsaturated monomers: adamanthyl (meth)acrylate, etc.

(v) Tricyclodecenyl-containing polymerizable unsaturated monomers: tricyclodecenyl (meth)acrylate, etc.

(vi) Aromatic ring-containing polymerizable unsaturated monomers: benzyl (meth)acrylate, styrene, α-methylstyrene, vinyl toluene, etc.

(vii) Alkoxysilyl-containing polymerizable unsaturated monomers: vinyltrimethoxysilane, vinyltriethoxysilane, vinyltris(2-methoxyethoxy)silane, γ-(meth)acryloyloxypropyl trimethoxysilane, γ-(meth)acryloyloxypropyl triethoxysilane, etc.

(viii) Polymerizable unsaturated monomers having a fluorinated alkyl group: perfluoroalkyl (meth)acrylates, such as perfluorobutylethyl (meth)acrylate and perfluorooctylethyl (meth)acrylate; fluoroolefin; etc.

(ix) Polymerizable unsaturated monomers having a photopolymerizable functional group, such as a maleimide group.

(x) Vinyl compounds: N-vinyl pyrrolidone, ethylene, butadiene, chloroprene, vinyl propionate, vinyl acetate, etc.

(xi) Carboxy-containing polymerizable unsaturated monomers: (meth)acrylic acid, maleic acid, crotonic acid, β-carboxyethyl acrylate, etc.

(xii) Nitrogen-containing polymerizable unsaturated monomers: (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylenebis (meth)acrylamide, ethylenebis (meth)acrylamide, adducts of glycidyl (meth)acrylate with amine compounds, etc.

(xiii) Polymerizable unsaturated monomers having two or more polymerizable unsaturated groups per molecule: allyl (meth)acrylate, 1,6-hexanediol di(meth)acrylate, etc.

(xiv) Epoxy-containing polymerizable unsaturated monomers: glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, etc.

(xv) (Meth)acrylates having an alkoxy-terminated polyoxyethylene chain.

(xvi) Sulfonic acid group-containing polymerizable unsaturated monomers: 2-acrylamide-2-methylpropanesulfonic acid, 2-sulfoethyl (meth)acrylate, allylsulfonic acid, and 4-styrenesulfonic acid; sodium salts and ammonium salts of such sulfonic acids; etc.

(xvii) Phosphate group-containing polymerizable unsaturated monomers: acid phosphoxyethyl (meth)acrylate, acid phosphoxypropyl (meth)acrylate, acid phosphoxypoly(oxyethylene) glycol (meth)acrylate, acid phosphoxypoly(oxypropylene) glycol (meth)acrylate, etc.

(xviii) Polymerizable unsaturated monomers having a UV-absorbing functional group: 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole, etc.

(xix) UV-stable polymerizable unsaturated monomers: 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, etc.

(xx) Carbonyl-containing polymerizable unsaturated monomers: acrolein, diacetone acrylamide, diacetone methacrylamide, acetoacetoxyethyl methacrylate, formylstyrol, $C_4$-$C_7$ vinyl alkyl ketones (e.g., vinyl methyl ketone, vinyl ethyl ketone, and vinyl butyl ketone), etc.

Among the above monomers (i) to (xx), the (meth)acrylates that include a hydroxy-terminated polyoxyethylene chain among the monomers (i), and the monomers (xi), (xvi), and (xvii) are water-dispersible group-containing polymerizable unsaturated monomers.

Of these, the carboxy-containing polymerizable unsaturated monomers (xi) are preferably used as the water-dispersible group-containing polymerizable unsaturated monomer, in terms of water dispersibility.

The synthesis of the water-soluble acrylic resin (A2) is not particularly limited. For example, the synthesis can be carried out by adding dropwise a monomer mixture while heating in the presence of an organic solvent, and performing polymerization.

The reaction temperature during polymerization is generally about 60 to about 200° C., and preferably about 70 to about 160° C. The reaction time is generally about 10 hours or less, and preferably about 0.5 to about 6 hours.

Examples of the polymerization initiator used in the above reaction include organic peroxides, such as benzoyl peroxide, octanoyl peroxide, lauroyl peroxide, stearoyl peroxide, cumene hydroperoxide, tert-butyl peroxide, di-tert-amyl peroxide, t-butyl peroxy-2-ethylhexanoate, tert-butyl peroxylaurate, tert-butyl peroxyisopropylcarbonate, tert-butylperoxyacetate, and diisopropylbenzene hydroperoxide; azo compounds, such as azobisisobutyronitrile, azobis(2,4-dimethylvaleronitrile), azobis(2-methylpropionenitrile), azobis(2-methylbutyronitrile), 4,4'-azobis(4-cyanobutanoic acid), dimethyl azobis(2-methylpropionate), azobis[2-methyl-N-(2-hydroxyethyl)-propionamide], and azobis{2-methyl-N-[2-(1-hydroxybutyl)]-propionamide}; persulfates, such as potassium persulfate, ammonium persulfate, and sodium persulfate; and the like. These polymerization initiators can be used singly or in a combination of two or more.

The amount of the polymerization initiator used is generally 0.01 to 20 mass %, preferably 0.1 to 15 mass %, and more preferably 0.3 to 10 mass %, based on the total amount the polymerizable unsaturated monomers, in terms of polymerization reactivity, etc.

The synthesis of the water-soluble acrylic resin (A2) is preferably performed in the presence of an organic solvent, in terms of production. The organic solvent can be suitably selected in consideration of the polymerization temperature, and the solubility, dispersibility, etc., of the acrylic resin in water.

Preferred organic solvents include alcohol solvents, cellosolve solvents, carbitol solvents, and the like. Specific examples include alcohol solvents, such as n-butanol; cellosolve solvents, such as ethylene glycol monobutyl ether, ethylene glycol monoisopropyl ether, ethylene glycol monomethyl ether, propylene glycol monomethyl ether, propylene glycol monopropyl ether, propylene glycol mono-n-butyl ether, dipropylene glycol monomethyl ether, and dipropylene glycol mono-n-butyl ether; carbitol solvents, such as diethylene glycol monobutyl ether, diethylene glycol monoethyl ether, and diethylene glycol monoethyl ether acetate; and the like.

Further, as the organic solvent, organic solvents immiscible with water, other than the above, can also be used within a range that does not interfere with the solubility and dispersibility of the acrylic resin (A2) in water. Examples of such organic solvents include aromatic hydrocarbon solvents, such as toluene and xylene; ester solvents, such as ethyl acetate and butyl acetate; ketone solvents, such as methyl ethyl ketone and cyclohexanone; and the like.

The water-soluble acrylic resin (A2) preferably has a weight average molecular weight of 2000 or more, more preferably 3000 to 50000, and even more preferably 5000 to 30000, in terms of the water dispersibility of the resin, the finished appearance and water resistance of the resulting coating film, etc.

In the present specification, the weight average molecular weight of the resin refers to a value calculated from a chromatogram measured by gel permeation chromatography based on the molecular weight of standard polystyrene. For the gel permeation chromatography, "HLC8120GPC" (produced by Tosoh Corporation) was used. The measurement was conducted using four columns: "TSKgel G-4000HXL," "TSKgel G-3000HXL," "TSKgel G-2500HXL," and "TSKgel G-2000HXL" (trade names; all produced by Tosoh Corporation), under the following conditions: mobile phase: tetrahydrofuran, measuring temperature: 40° C., flow rate: 1 cc/min, and detector: RI.

The water-soluble acrylic resin (A2) preferably has an acid value of 100 mgKOH/g or less, more preferably 0.5 to 60 mgKOH/g, and even more preferably 1 to 40 mgKOH/g, in terms of the storage stability of the coating composition, the distinctness of image and water resistance of the resulting coating film, etc.

The water-soluble acrylic resin (A2) preferably has a hydroxyl group as a crosslinking functional group, as with the acrylic resin particles (A1), in terms of coating resin compositions generally widely used as coating compositions for vehicles (e.g., acrylic melamine resin, acrylic isocyanate resin, etc.).

When the water-soluble acrylic resin (A2) has a hydroxyl group, the ratio of the hydroxy-containing polymerizable unsaturated monomer (monomer (i)) used is preferably 0.5 to 50 mass %, more preferably 1.0 to 40 mass %, and even more preferably 1.5 to 30 mass %, based on the total amount of the monomer components.

When the water-soluble acrylic resin (A2) has a hydroxyl group, the hydroxy value is preferably 1 to 200 mgKOH/g, more preferably 2 to 180 mgKOH/g, and even more preferably 5 to 170 mgKOH/g, in terms of the curability and water resistance of the resulting coating film, etc.

When the water-soluble acrylic resin (A2) is dispersed in water, in order to facilitate dissolution and dispersion in water, it is preferable to perform neutralization using a neutralizing agent, in terms of improving water dispersibility.

Examples of neutralizing agents include hydroxides of alkali metals or alkaline earth metals, such as sodium hydroxide, potassium hydroxide, lithium hydroxide, calcium hydroxide, and barium hydroxide; ammonia; primary monoamine compounds, such as ethylamine, propylamine, butylamine, cyclohexylamine, monoethanolamine, isopropanolamine, neopentanolamine, 2-aminopropanol, 3-aminopropanol, and 2-amino-2-methylpropanol; secondary monoamine compounds, such as diethylamine, dibutylamine, diethanolamine, dipropylamine, diisopropanolamine, N-methylethanolamine, N-ethylethanolamine, and N-methylisopropanolamine; tertiary monoamine compounds, such as triethylamine, tributylamine, dimethylethanolamine, diethylethanolamine, methyldiethanolamine, dimethylaminoethanol, and triethanolamine; polyamine compounds, such as ethylenediamine, diethylenetriamine, hydroxyethylaminoethylamine, ethylaminoethylamine, and methylaminopropylamine; pyridine; morpholine; and the like.

Of these, it is preferable to use primary monoamine compounds, secondary monoamine compounds, tertiary monoamine compounds, and polyamine compounds.

The amount of the water-soluble acrylic resin (A2) is preferably 0 to 95 mass %, more preferably 10 to 75 mass %, and even more preferably 15 to 60 mass %, based on the total solids content of the film-forming resin (A).

Polyester Resin (A3)

A polyester resin (A3) can be synthesized by esterification reaction of a polybasic acid and a polyhydric alcohol by a known method in a standard manner. Moreover, in terms of water dispersibility, the polyester resin is preferably one having an acid group, such as a carboxyl group.

Polybasic acids are compounds having two or more carboxyl groups per molecule. Examples include phthalic acid, isophthalic acid, terephthalic acid, succinic acid, adipic acid, azelaic acid, sebacic acid, naphthalene dicarboxylic acid, 4,4-diphenyldicarboxylic acid, diphenylmethane-4,4'-dicarboxylic acid, HET acid, maleic acid, fumaric acid, itaconic acid, trimellitic acid, pyromellitic acid, cyclohexane-1,3-dicarboxylic acid, cyclohexane-1,4-dicarboxylic acid, hexahydrophthalic acid, hexahydroisophthalic acid, hexahydroterephthalic acid, tetrahydrophthalic acid, hexahydrotrimellitic acid, methyl hexahydrophthalic acid, and anhydrides thereof; and the like.

Polyhydric alcohols are compounds having two or more hydroxyl groups per molecule. Examples include glycol compounds, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, and neopentyl glycol hydroxypivalate; polylactone diols obtained by adding lactone compounds, such as ε-caprolactone, to such glycol compounds; polyester diol compounds, such as bis(hydroxyethyl)terephthalate; 1,3-cyclohexanedimethanol, 1,4-cyclohexanedimethanol, tricyclodecanedimethanol, hydrogenated bisphenol A, hydrogenated bisphenol F, spiroglycol, dihydroxymethyltricyclodecane, glycerol, trimethylolpropane, trimethylolethane, diglycerol, triglycerol, 1,2,6-hexanetriol, pentaerythritol, dipentaerythritol, dipentaerythritol, sorbitol, mannitol; hydroxycarboxylic acids, such as 2,2-dimethylolpropionic acid, 2,2-dimethylolbutanoic acid, 2,2-dimethylolpentanoic acid, 2,2-dimethylolhexanoic acid, and 2,2-dimethyloloctanoic acid; and the like.

Also usable as the polyester resin are fatty acid-modified polyester resins that are modified with fatty acids of (semi-)drying oils, such as linseed oil fatty acid, coconut oil fatty acid, safflower oil fatty acid, soybean oil fatty acid, sesame oil fatty acid, perilla oil fatty acid, hemp oil fatty acid, tall oil fatty acid, dehydrated castor oil fatty acid, etc. It is usually suitable that the proportion of such modifying fatty acid be not more than 30 wt. % in terms of oil length. Moreover, the polyester resin may be obtained by partially reacting monobasic acid, such as benzoic acid.

Further usable as the polyester resin are those obtained by reacting monoepoxy compounds, such as α-olefin epoxides (e.g., propylene oxide and butylene oxide) and Cardura E10 (trade name, produced by Japan Epoxy Resins Co., Ltd.; glycidyl ester of a synthetic highly branched saturated fatty acid), etc., with the acid group of the polyester resin.

When a carboxyl group is introduced into the polyester resin, the introduction can be carried out by, for example, adding an acid anhydride to hydroxy-containing polyester, followed by half-esterification.

The resin preferably has a hydroxyl group as a crosslinking functional group in terms of coating resin compositions generally widely used as coating compositions (e.g., acrylic melamine resin, acrylic isocyanate resin, etc.).

When the polyester resin has a hydroxyl group, the hydroxy value is preferably 10 to 250 mgKOH/g, and particularly preferably 40 to 170 mgKOH/g, in terms of the water resistance and curability of the coating film.

When the polyester resin has an acid group, the acid value is preferably 5 to 100 mgKOH/g, and particularly preferably 10 to 60 mgKOH/g, in terms of the water resistance and adhesion of the coating film.

The number average molecular weight of the polyester resin is preferably 1000 to 100000, and more particularly preferably 1000 to 50000, in terms of the water resistance and curability of the coating film.

When the polyester resin has an acid group and is dispersible in water, in order to facilitate mixing and dispersion in water, it is preferable to perform neutralization using a neutralizing agent, as with the water-soluble acrylic resin (A2), in terms of improving water dispersibility.

Usable neutralizing agents are the same as those exemplified for the component (A2).

The amount of the polyeser resin (A3) is preferably 0 to 95 mass %, more preferably 10 to 75 mass %, and still more preferably 15 to 60 mass %, based on the total solids content of the film-forming resin (A).

Polyurethane Resin (A4)

The polyurethane resin (A4) is a resin that has urethane bonds in the molecule and that can be dissolved or dispersed in water. In an aqueous medium, the polyurethane resin may be in the form of an aqueous solution, a colloidal dispersion, an emulsion, or a slurry. Of these, a colloidal dispersion type or emulsion type resin is preferable.

As the polyurethane resin (A4), known polyester resins are usable. For example, a polyurethane obtained by reacting a polyisocyanate with a polyol, such as polyester polyol, polycarbonate polyol, or polyether polyol, and optionally further subjecting the reaction product to chain extension in the presence of a chain extender, which is a low molecular compound having at least two active hydrogens in the molecule, such as diol or diamine, can be preferably used. The polyurethane resin can be stably dispersed or dissolved in an aqueous medium and used.

Examples of polyester polyols used for the production of the aqueous urethane resin (A4) include polyester diols obtained by reacting an aliphatic diol, such as 1,4-butane diol or 1,6-hexane diol with an aliphatic dicarboxylic acid, such as adipic acid or sebacic acid; polyester diols obtained by reacting such an aliphatic diol with an aromatic dicarboxylic acid, such as terephthalic acid; and the like. Examples of the polycarbonate polyol include polycarbonate diols obtained by reacting a diol, such as 1,6-hexane diol or 3-methyl-1,5-pentane diol, with a carbonate compound, such as dimethyl carbonate. Examples of the polyether polyol include polyalkylene glycols obtained by ring-opening polymerization of ethylene oxide, propylene oxide, or the like.

Examples of polyisocyanates include aliphatic or alicyclic diisocyanates, such as hexamethylene diisocyanate, dicyclohexylmethane diisocyanate, isophorone diisocyanate, and hydrogenated xylylene diisocyanate; isocyanurate ring adducts thereof; and the like.

Examples of diols as the chain extender include ethylene glycol, 1,4-butane diol, 1,5-pentane diol, 3-methyl-1,5-pentanediol, cyclohexane diol, and the like. Examples of diamines include ethylene diamine, propylene diamine, xylylene diamine, and the like.

The polyurethane resin (A4) can be stably dispersed or dissolved in water by, for example, the following methods:
(1) a method in which carboxyl groups are introduced into a polyurethane resin by using a carboxy-containing diol, such as dimethylolpropionic acid or dimethylolbutanoic acid, as a starting material for producing a polyurethane resin, and some or all of the carboxyl groups are neutralized to impart hydrophilicity, so that the polyurethane resin disperses or dissolves in water by self-emulsification;
(2) a method in which a water-soluble polyurethane resin is produced by using a hydrophilic polyol, such as polyethylene glycol, as a starting material polyol for producing a polyurethane resin and dispersed or dissolved in water.

(3) a method in which a polyurethane polymer that has completed the reaction or a polyurethane polymer whose terminal isocyanate group has been blocked with a blocking agent, such as an oxime, alcohol, phenol, mercaptan, amine, sodium bisulfite, or the like, is forcedly dispersed in water using a nonionic and/or cationic emulsifier and mechanical shearing force; and (4) a method in which a urethane polymer having a terminal isocyanate group is mixed with water, an emulsifier, and a chain extender, and dispersion and conversion into a high-molecular-weight polymer are performed simultaneously using a mechanical shearing force.

The polyurethane resin (A4) is not limited to ones obtained by a single production method, and a mixture of polyurethanes obtained by various methods can also be used.

The amount of the polyurethane resin (A4) is generally preferably 0 to 40%, and particularly preferably 5 to 30 mass %, based on the total solids content of the film-forming resin (A), in terms of finish quality, etc.

Phosphoric Acid Compound (B)

The phosphoric acid compound (B) is a compound represented by the following Formula (1):

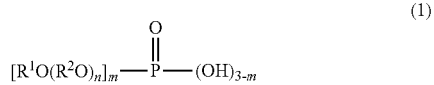

(wherein m is 1 or 2, n is 0 or an integer of 1 to 20,
$R^1$ is a substituted or unsubstituted hydrocarbon group having 2 to 20 carbon atoms,
when m is 2, each $R^1$ may be the same or different,
$R^2$ is $C_{2-4}$ alkylene;
when n is 2 or more, n number of oxyalkylene units ($R^2O$) may be the same or different, wherein when they are different, the addition of $(R^2O)_n$ may be random-addition, block-addition, or alternate addition, and
when m is 2, each $(R^2O)_n$ may be the same or different.

The phosphoric acid compound (B) may also be a neutralization salt.

The phosphoric acid compound (B) having the structure of the above Formula (1) has a phosphate group and a hydrocarbon group, and preferably further has a (poly)oxyalkylene group. This compound has the action as an acid compound derived from the phosphate group, and also has the action as a surfactant due to the combined use of the phosphate group, which is a hydrophilic group (and preferably a (poly)oxyalkylene group, which is a nonionic group) and the hydrocarbon group, which is a hydrophobic group.

Moreover, in the case of an aqueous coating composition in which a film-forming resin (A) contains a hydroxyl group as a crosslinking functional group, and the composition comprises a crosslinking agent, such as melamine resin, whose reactivity is promoted by an acid catalyst, the effect of the phosphate group in the phosphoric acid compound (B) improves curability and adhesion of the resulting coating film. Accordingly, a multilayer coating film also having excellent coating film performance, such as water resistance, can be obtained.

In Formula (1) above, $R^1$ is a substituted or unsubstituted hydrocarbon group. In terms of coating film appearance such as distinctness of image of the resulting coating film, and coating film performance such as water resistance, $R^1$ is preferably a hydrocarbon group having 2 to 20 carbon atoms, more preferably 4 to 20 carbon atoms, even more preferably 7 to 20 carbon atoms, and particularly preferably 7 to 16 carbon atoms.

The hydrocarbon group is preferably linear or branched alkyl, and particularly preferably branched alkyl. Examples of $C_{2-20}$ linear or branched alkyl include ethyl, n-propyl, isopropyl, n-butyl, isobutyl, sec-butyl, tert-butyl, n-pentyl, n-hexyl, 2-ethylbutyl, 3-methylpentyl, 1,2-dimethylbutyl, n-heptyl, 2-ethylpentyl, 3-ethylpentyl, 1,4-dimethylpentyl, 2-methyl-1-isopropylpropyl, 1-ethyl-3-methylbutyl, n-octyl, 4-ethylhexyl, 3-methyl-1-isopropylbutyl, 2-methyl-1-isopropylbutyl, 3,4,4-trimethylpentyl, 1,5-dimethylhexyl, n-nonyl, 2-ethylheptyl, 3,5,5-trimethylhexyl, 1,6-dimethylheptyl, n-decyl, 2-ethyloctyl, 4-ethyloctyl, 3,6,6-trimethylheptyl, 1,7-dimethyloctyl, n-undecyl, 2-ethylnonyl, 3,7,7-trimethyloctyl, 1,8-dimethylnonyl, n-dodecyl, 2-ethyldecyl, 3,8,8-trimethylnonyl, 1,9-dimethyldecyl, n-tridecyl, 2-ethylundecyl, 3,9,9-trimethyldecyl, 1,10-dimethylundecyl, n-tetradecyl, 2-ethyldodecyl, 3,10,10-trimethylundecyl, 1,11-dimethyldodecyl, n-pentadecyl, 2-ethyltridecyl, 3,11,11-trimethyldodecyl, 1,12-dimethyltridecyl, n-hexadecyl, 2-ethyltetradecyl, 3,12,12-trimethyltridecyl, 1,13-dimethyltetradecyl, n-heptadecyl, 2-ethylpentadecyl, 3,13,13-trimethyltetradecyl, 1,14-dimethylpentadecyl, n-octadecyl, 2-ethylhexadecyl, 3,14,14-trimethylpentadecyl, 1,15-dimethylhexadecyl, n-nonadecyl, 2-ethylheptadecyl, 3,15,15-trimethylhexadecyl, 1,16-dimethylheptadecyl, n-icosyl, 2-ethyloctadecyl, 3,16,16-trimethylheptadecyl, 1,17-dimethyloctadecyl, and the like. Of these, $R^1$ in Formula (1) is particularly preferably $C_{7-20}$ branched alkyl.

When $R^1$ is branched alkyl, a coating film having excellent distinctness of image can be formed, even when the coating composition of the present invention is applied after being stored for a relatively long period of time.

When $R^1$ is a substituted hydrocarbon group, examples of substituents include halogen (e.g., fluorine, chlorine, bromine, etc.), alkenyl (e.g., $C_{2-6}$ alkenyl having 1 or 2 carbon-carbon double bonds, such as vinyl, allyl, 2-butenyl, 3-butenyl, 2-pentenyl, 1,3-pentadienyl, and 2-hexenyl), aryl (e.g., $C_{6-16}$ aryl, such as phenyl, naphthyl, biphenyl, anthracenyl, phenanthryl, and pyrenyl), alkoxy (e.g., $C_{1-6}$ alkoxy, such as methoxy, ethoxy, n-propoxy, isopropoxy, n-butoxy, isobutoxy, sec-butoxy, tert-butoxy, n-pentyloxy, n-hexyloxy, 2-ethylbutoxy, 3-methylpentyloxy, and 1,2-dimethylbutoxy), and the like.

The phosphoric acid compound (B) can be obtained by, for example, a phosphorylating agent, such as orthophosphoric acid, phosphorus pentaoxide (anhydrous phosphoric acid), polyphosphoric acid, or phosphorus oxychloride, with an alcohol or an alcohol alkylene oxide adduct obtained by addition reaction of an alkylene oxide to an alcohol.

The reaction of a phosphorylating agent with an alcohol or an alcohol alkylene oxide adduct can be performed by a known method. In that case, the alcohol and alcohol alkylene oxide adduct may be independently used singly, or in a combination of two or more.

The phosphoric acid compound (B) represented by Formula (1) is generally obtained as a mixture of a monoester and a diester.

Examples of alcohols include ethanol, propanol, isopropanol, butanol, isobutanol, pentanol, hexanol, 2-ethylbutanol, 3-methylpentanol, cyclohexyl alcohol, heptanol, 2-ethylpentanol, 3-ethylpentanol, octanol, 2-ethylhexanol, 4-ethylhexanol, nonyl alcohol, 2-ethylheptanol, decanol, 2-ethyloctanol, 4-ethyloctanol, dodecanol, hexadecanol, octadecanol, and the like.

Preferred among these are alcohols having $C_{7-20}$ alkyl, such as heptanol, 2-ethylpentanol, 3-ethylpentanol, octanol, 2-ethylhexanol, 4-ethylhexanol, nonyl alcohol, 2-ethylheptanol, decanol, 2-ethyloctanol, 4-ethyloctanol, dodecanol, hexadecanol, and octadecanol; and particularly preferred are alcohols having $C_{7-20}$ branched alkyl, such as 2-ethylpentanol, 3-ethylpentanol, 2-ethylhexanol, 4-ethylhexanol, 2-ethylheptanol, 2-ethyloctanol, and 4-ethyloctanol.

Examples of alkylene oxides include $C_{2-4}$ alkylene oxides, such as ethylene oxide, propylene oxide, and butylene oxide. These can be used singly, or in a combination of two or more. Of these, ethylene oxide can be preferably used. Therefore, in Formula (1), examples of the oxyalkylene unit ($R^2O$) include oxyethylene, oxypropylene, oxybutylene, etc. Oxyalkylene units may be the same or different. Moreover, the oxyalkylene unit ($R^2O$) is preferably oxyethylene etc.

In Formula (1), n is the addition mole number of alkylene oxide. n is preferably 1 to 20, more preferably 1 to 10, and even more preferably 1 to 5. In a preferred embodiment, the phosphoric acid compound (B) may be a mixture of a phosphoric acid compound represented by Formula (1) wherein n is 0, and a phosphoric acid compound represented by Formula (1) wherein n is an integer of 1 to 20.

The number average molecular weight of the phosphoric acid compound (B) is preferably 100 to 3000, more preferably 100 to 2500, and even more preferably 100 to 2000. The molecular weight of the phosphoric acid compound (B) can be calculated based on information of the molecular weight of the raw materials used and the synthesis conditions. Moreover, the average molecular weight of the phosphoric acid compound (B) can be measured in the same manner as described above regarding the water-soluble acrylic resin.

The HLB value of the phosphoric acid compound (B) is preferably 3 to 17, more preferably 3 to 15, and even more preferably 4 to 13. If the HLB value is less than 5, hydrophilicity is low and emulsification ability is weak; therefore, the stability of the coating composition, smoothness and distinctness of image may be insufficient. If the HLB value exceeds 17, hydrophilicity is overly high; therefore, the water resistance of the resulting coating film may be reduced, and popping resistance during coating may be reduced.

The HLB value is a value expressing the degree of affinity of surfactants with water and oil (an organic compound insoluble in water). HLB is an acronym for Hydrophile-Lipophile Balance. In the present invention, the HLB value is calculated using the following Griffin equation based on a mass fraction:

$$HLB = 20(MH/M)$$

(wherein MH represents the molecular weight of the hydrophilic group moiety, and M represents the molecular weight of the compound (surfactant)).

In the present invention, the HLB value of the phosphoric acid compound (B) is defined as the HLB value of a non-ionic compound used as a raw material in the production of the phosphoric acid compound (B).

Specifically, as described above regarding the production of the phosphoric acid compound (B), the phosphoric acid compound (B) is obtained by reacting a phosphorylating agent with an alcohol or an alcohol alkylene oxide adduct. The HLB value of the phosphoric acid compound (B) of the present invention refers to the HLB value of the alcohol alkylene oxide adduct among the raw materials for producing the phosphoric acid compound (B). In this case, if the alcohol, which is a raw material of the alcohol alkylene oxide adduct, is water-soluble, the HLB value cannot be calculated.

The phosphoric acid compound (B) may be used singly, or in a combination of two or more. Moreover, the phosphoric acid compound (B) may be a commercial product or a synthesized product.

The amount of the phosphoric acid compound (B) is preferably 0.1 to 10 mass %, more preferably 0.3 to 7 mass %, and even more preferably 0.5 to 5 mass %, based on the solids content of the component (A).

Crosslinking Agent (C)

The aqueous first coating composition (X) of the present invention may contain, if necessary, a crosslinking agent (C), in terms of the curability of the coating composition and the coating film performance, such as water resistance, of the resulting coating film.

The crosslinking agent is not particularly limited. A crosslinking agent that is reactive with the crosslinking reactive group of the film-forming resin (A) can be used, depending on the crosslinking reactive group. Specific examples of the crosslinking agent (C) include amino resins, (blocked) polyisocyanate compounds, polyhydrazide compounds, polysemicarbazide compounds, carbodiimide group-containing compounds, oxazoline group-containing compounds, epoxy compounds, polycarboxylic acids, and the like. The curing agents may be used singly, or in a combination of two or more.

As coating resin compositions, combinations of a hydroxy-containing resin, such as acrylic resin, and a crosslinking agent that is reactive with the hydroxyl group of such a resin are generally widely used, in terms of the finished appearance and coating film performance. Thus, among the above crosslinking agents, amino resins and (blocked) polyisocyanate compounds can be particularly preferably used.

Examples of usable amino resins include partially or fully methylolated amino resins obtained by reacting amino components with aldehyde components. Examples of amino components include melamine, urea, benzoguanamine, acetoguanamine, steroguanamine, spiroguanamine, dicyandiamide, and the like. Examples of aldehyde components include formaldehyde, paraformaldehyde, acetaldehyde, benzaldehyde, and the like.

The methylolated amino resins in which some or all of the methylol groups have been etherified with suitable alcohols are also usable. Examples of alcohols that can be used for the etherification include methyl alcohol, ethyl alcohol, n-propyl alcohol, i-propyl alcohol, n-butyl alcohol, i-butyl alcohol, 2-ethyl-1-butanol, 2-ethyl-1-hexanol, and the like.

Preferred amino resins are melamine resins. Particularly preferred are a methyl-etherified melamine resin obtained by etherifying some or all of the methylol groups of a partially or fully methylolated melamine resin with methyl alcohol; a butyl-etherified melamine resin obtained by etherifying some or all of the methylol groups of a partially or fully methylolated melamine resin with butyl alcohol; and a methyl-butyl mixed etherified melamine resin obtained by etherifying some or all of the methylol groups of a partially or fully methylolated melamine resin with methyl alcohol and butyl alcohol. A methyl-butyl mixed etherified melamine resin is more preferable. The weight average molecular weight of the melamine resin is preferably 400 to 6,000, more preferably 500 to 4,000, and even more preferably 600 to 3,000.

A commercially available product can be used as the melamine resin. Examples of commercially available products include "Cymel 202," "Cymel 203," "Cymel 204,"

"Cymel 211," "Cymel 212," "Cymel 238," "Cymel 251," "Cymel 253," "Cymel 254," "Cymel 303," "Cymel 323," "Cymel 324," "Cymel 325," "Cymel 327," "Cymel 350," "Cymel 370," "Cymel 380," "Cymel 385," "Cymel 1156," "Cymel 1158," "Cymel 1116," and "Cymel 1130" (all produced by Nihon Cytec Industries Inc.); "Resimene 735," "Resimene 740," "Resimene 741," "Resimene 745," "Resimene 746," and "Resimene 747" (all produced by Monsanto Co., Ltd.); "U-Van 120," "U-Van 20HS," "U-Van 20SE," "U-Van 2021," "U-Van 2028," and "U-Van 28-60" (all produced by Mitsui Chemicals, Inc.); "SUMIMAL M55," "SUMIMAL M30W," and "SUMIMAL M50W" (all produced by Sumitomo Chemical Co., Ltd.); and the like.

When a melamine resin is used, a sulfonic acid, such as paratoluenesulfonic acid, dodecylbenzenesulfonic acid, or dinonylnaphthalenesulfonic acid; a neutralization salt of such a sulfonic acid with amine; a neutralization salt of a phosphoric ester compound with amine; or the like may be used as a curing catalyst.

Polyisocyanate compounds have two or more isocyanate groups per molecule. Specific examples of polyisocyanate compounds include aliphatic polyisocyanates, alicyclic polyisocyanates, aromatic-aliphatic polyisocyanates, aromatic polyisocyanates, and derivatives of these polyisocyanates.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatomethyl caproate; aliphatic triisocyanates, such as lysine ester triisocyanate, 1,4,8-triisocyanateoctane, 1,6,11-triisocyanateundecane, 1,8-diisocyanato-4-isocyanatomethyloctane, 1,3,6-triisocyanatehexane, and 2,5,7-trimethyl-1,8-diisocyanato-5-isocyanatomethyloctane; and the like.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or mixtures thereof, and norbornane diisocyanate; alicyclic triisocyanates, such as 1,3,5-triisocyanatecyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane; and the like.

Examples of aromatic-aliphatic polyisocyanates include aromatic-aliphatic diisocyanates, such as 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aromatic-aliphatic triisocyanates, such as 1,3,5-triisocyanatomethylbenzene; and the like.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixtures thereof, 2,4- or 2,6-tolylene diisocyanate or mixtures thereof, 4,4'-toluidine diisocyanate, and 4,4'-diphenylether diisocyanate; aromatic triisocyanates, such as triphenylmethane-4,4',4"-triisocyanate, 1,3,5-triisocyanatobenzene, and 2,4,6-triisocyanatotoluene; aromatic tetraisocyanates, such as diphenylmethane-2,2',5,5'-tetraisocyanate; and the like.

Examples of polyisocyanate derivatives include dimers, trimers, biurets, allophanates, carbodiimides, uretdiones, urethoimines, isocyanurates, oxadiazinetriones, polymethylene polyphenyl polyisocyanates (crude MDI, polymeric MDI), crude TDI, and the like of polyisocyanate compounds mentioned above.

Further, usable polyisocyanate compounds are blocked polyisocyanate compounds obtained by blocking free isocyanate groups of polyisocyanate compounds with a blocking agent. When a blocked polyisocyanate compound is heated to, for example, 100° C. or more, preferably 130° C. or more, the isocyanate groups are regenerated and can readily react with reactive groups.

Examples of such blocking agents include phenol-based blocking agents, such as phenol, cresol, xylenol nitrophenol, ethylphenol, hydroxydiphenyl, butylphenol, isopropylphenol, nonylphenol, octylphenol, and methyl hydroxybenzoate; lactam-based blocking agents, such as ε-caprolactam, δ-valerolactam, γ-butyrolactam, and β-propiolactam; aliphatic alcohol-based blocking agents, such as methanol, ethanol, propyl alcohol, butyl alcohol, amyl alcohol, and lauryl alcohol; ether-based blocking agents, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; benzyl alcohol; glycolic acid; glycolates, such as methyl glycolate, ethyl glycolate, and butyl glycolate; lactic acid; lactates, such as methyl lactate, ethyl lactate, and butyl lactate; alcohol-based blocking agents, such as methylol urea, methylol melamine, diacetone alcohol, 2-hydroxyethyl acrylate, and 2-hydroxyethyl methacrylate; oxime-based blocking agents, such as formamidoxime, acetamidoxime, acetoxime, methylethylketoxime, diacetyl monoxime, benzophenone oxime, and cyclohexaneoxime; active methylene-based blocking agents, such as dimethyl malonate, diethyl malonate, ethyl acetoacetate, methyl acetoacetate, and acetylacetone; mercaptan-based blocking agents, such as butyl mercaptan, t-butyl mercaptan, hexyl mercaptan, t-dodecyl mercaptan, 2-mercaptobenzothiazole, thiophenol, methylthiophenol, and ethylthiophenol; acid amide-based blocking agents, such as acetanilide, acetanisidide, acetotoluide, acrylamide, methacrylamide, acetamide, stearamide, and benzamide; imide-based blocking agents, such as succinimide, phthalimide, and maleimide; amine-based blocking agents, such as diphenylamine, phenylnaphthylamine, xylidine, N-phenylxylidine, carbazole, aniline, naphthylamine, butylamine, dibutylamine, and butylphenylamine; imidazole-based blocking agents, such as imidazole and 2-ethylimidazole; pyrazole-based blocking agents, such as 3,5-dimethylpyrazole; urea-based blocking agents, such as urea, thiourea, ethylene urea, ethylene thiourea, and diphenylurea; carbamate-based blocking agents, such as phenyl N-phenylcarbamate; imine-based blocking agents, such as ethyleneimine and propyleneimine; sulfite salt-based blocking agents, such as sodium bisulfite and potassium bisulfite; and other blocking agents.

When a polyisocyanate compound is used, an organic tin compound or the like can be used as a curing catalyst.

Polyisocyanate compounds can be used as crosslinking agents, for example, for resins containing a hydroxyl or amino group.

Polyhydrazide compounds have two or more hydrazide groups per molecule.

Examples of polyhydrazide compounds include saturated aliphatic carboxylic acid dihydrazides having 2 to 18 carbon atoms, such as oxalic acid dihydrazide, malonic acid dihydrazide, succinic acid dihydrazide, glutaric acid dihydrazide, adipic acid dihydrazide, and sebacic acid dihydrazide; dihydrazides of monoolefinic unsaturated dicarboxylic acids, such as maleic acid dihydrazide, fumaric acid dihydrazide, and itaconic acid dihydrazide; polyhydrazides of carbonic acids, such as carbonic acid dihydrazide; polyhydrazides of aromatic polycarboxylic acids, such as dihydrazides of phthalic acid, terephthalic acid, or isophthalic acid, and dihydrazide, trihydrazide, or tetrahydrazide of pyromellitic acid; aliphatic trihydrazides, such as nitrilotriacetic acid trihydrazide, citric acid trihydrazide, and 1,2,4-benzene trihydrazide; tetrahydrazides, such as ethylenediaminetetraacetic acid tetrahydrazide and 1,4,5,8-naphthoic acid tetrahydrazide; polyhydrazides obtained by reacting an oligomer containing a carboxylic acid lower alkyl ester group with hydrazine or hydrazine hydrate (see JPS52-022878B); and the like.

A polyhydrazide compound with overly high hydrophobicity makes dispersion in water difficult, and a uniform crosslinked coating film cannot be obtained. Thus, it is preferable to use a compound with moderate hydrophilicity having a relatively low molecular weight (less than about 300). Examples of such polyhydrazide compounds include dihydrazide compounds of $C_4$-$C_{12}$ dicarboxylic acids, such as succinic acid dihydrazide, glutaric acid dihydrazide, adipic acid dihydrazide, and sebacic acid dihydrazide.

Polyhydrazide compounds can be used as crosslinking agents, for example, for resins containing a carbonyl group.

Polysemicarbazide compounds have two or more semicarbazide groups per molecule.

Examples of polysemicarbazide compounds include aliphatic, alicyclic, or aromatic bissemicarbazides; polyfunctional semicarbazides obtained by reacting diisocyanates, such as hexamethylene diisocyanate or isophorone diisocyanate, or polyisocyanate compounds derived therefrom, with excess N,N-substituted hydrazines, such as N,N-dimethylhydrazine, or hydrazides mentioned above; aqueous polyfunctional semicarbazides obtained by reacting isocyanate groups of reaction products of polyisocyanate compounds mentioned above, polyether, and active hydrogen compounds containing a hydrophilic group, such as polyol compounds or polyethylene glycol monoalkyl ether compounds, with excess dihydrazides mentioned above (see, for example, JPH08-151358A); compounds having a semicarbazide group, such as mixtures of polyfunctional semicarbazides mentioned above and aqueous polyfunctional semicarbazides mentioned above; compounds having a hydrazone group, such as bisacetyl dihydrazone; and the like.

Polysemicarbazide compounds can be used as crosslinking agents, for example, for resins containing a carbonyl group.

Carbodiimide group-containing compounds are obtained, for example, by reacting isocyanate groups of polyisocyanate compounds with each other to remove carbon dioxide.

Examples of corresponding commercially available products include "Carbodilite V-02," "Carbodilite V-02-L2," "Carbodilite V-04," "Carbodilite E-01," and "Carbodilite E-02" (trade names, all produced by Nisshinbo Industries, Inc.).

Carbodiimide group-containing compounds can be used as crosslinking agents, for example, for resins containing a carboxyl group.

Examples of oxazoline group-containing compounds include (co)polymers obtained by copolymerizing polymers having an oxazoline group, such as polymerizable unsaturated monomers having an oxazoline group, optionally with other polymerizable unsaturated monomers by a known method (e.g., solution polymerization, emulsion polymerization, etc.).

Examples of polymerizable unsaturated monomers having an oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, and the like.

Examples of other polymerizable unsaturated monomers include $C_{1-24}$ alkyl or cycloalkyl esters of (meth)acrylic acid, such as methyl (meth)acrylate, ethyl (meth)acrylate, propyl (meth)acrylate, butyl (meth)acrylate, 2-ethylhexyl (meth)acrylate, cyclohexyl (meth)acrylate, lauryl (meth)acrylate, and isobornyl (meth)acrylate; $C_{2-8}$ hydroxyalkyl esters of (meth)acrylic acid, such as 2-hydroxyethyl (meth)acrylate and hydroxypropyl (meth)acrylate; vinyl aromatic compounds, such as styrene and vinyl toluene; adducts of (meth)acrylamide, dimethylaminopropyl (meth)acrylamide, dimethylaminoethyl (meth)acrylate, or glycidyl (meth)acrylate with amine compounds; polyethylene glycol (meth)acrylate; N-vinyl pyrrolidone, ethylene, butadiene, chloroprene, vinyl propionate, vinyl acetate, (meth)acrylonitrile, and the like. These can be suitably selected singly, or in a combination of two or more.

Oxazoline group-containing compounds can be used as crosslinking agents, for example, for resins containing a carboxyl group.

Epoxy compounds have two or more epoxy groups per molecule. Specific examples include diepoxy compounds, such as bis(3,4-epoxycyclohexylmethyl)adipate, epoxy group-containing acrylic resins, and the like.

Epoxy compounds can be used as crosslinking agents, for example, for resins containing an acid or amino group.

Examples of polycarboxylic acids include aliphatic polybasic acid compounds, such as adipic acid, azelaic acid, sebacic acid, 1,4-cyclohexanedicarboxylic acid, 1,2-cyclohexanedicarboxylic acid, 1,2,4-butanetricarboxylic acid, and 1,2,3,4-butanetetracarboxylic acid; aromatic polybasic acid compounds, such as phthalic acid, isophthalic acid, terephthalic acid, and trimellitic acid; half-esters produced by addition reaction of polyol and 1,2-acid anhydride; addition reaction product of polyepoxide and 1,2-acid anhydride in an amount of 2 equivalents or more relative to the epoxy groups of the polyepoxide; carboxy-containing acrylic polymers; acrylic polymers having a group obtained by half-esterification of an acid anhydrous group; carboxy-containing polyester-based polymers; and the like.

Polycarboxylic acid can be used as crosslinking agents, for example, for epoxy or carbodiimide group-containing resins.

The amounts of the film-forming resin (A), the phosphoric acid compound (B), and the crosslinking agent (C) in the aqueous first colored coating composition (X) of the present invention are as follows. Based on the total resin solids content of the components (A) and (C), the amount of the film-forming resin (A) is 1 to 100 mass %, preferably 10 to 90 mass %, and more preferably 20 to 80 mass %; the amount of the crosslinking agent (C) is 0 to 60 mass %, preferably 3 to 50 mass %, and more preferably 5 to 40 mass %; and the amount of the phosphoric acid compound (C) is 0.1 to 10 mass %, preferably 0.3 to 7 mass %, and more preferably 0.5 to 5 mass %.

In the aqueous first colored coating composition (X) of the present invention, a pigment can be used, if necessary. Examples of pigments include color pigments, such as titanium oxide, zinc white, carbon black, phthalocyanine blue, Prussian blue, cobalt blue, azo pigments, phthalocyanine pigments, quinacridone pigments, isoindoline pigments, threne pigments, and perylene pigments; extender pigments, such as talc, clay, kaolin, baryta, barium sulfate, barium carbonate, calcium carbonate, silica, and alumina white; effect pigments, such as aluminum powder, mica powder, and titanium oxide-coated mica powder; and the like.

The aqueous first colored coating composition (X) preferably contains, as at least one pigment, a color pigment and/or an extender pigment among the above pigments.

A preferable amount of the pigment is generally 0 to 250 mass %, and particularly 3 to 150 mass %, based on the total resin solids content of the component (A) and the optionally added component (C).

The aqueous first colored coating composition (X) of the present invention may further contain a curing catalyst, a dispersant, an anti-settling agent, an organic solvent, an antifoaming agent, a thickener, an ultraviolet absorber, a light stabilizer, a surface control agent, a plasticizer, etc., if necessary.

A preferable solids content of the aqueous first colored coating composition (X) is typically 30 to 70 mass %, particularly 35 to 60 mass %, and more particularly 40 to 55 mass %.

The aqueous coating composition (X) may be a single-liquid or multi-liquid coating composition. In view of storage stability, the multi-liquid coating composition may be, for example, a two-liquid coating composition composed of a main agent containing a base resin, and a crosslinking agent. In general, it is preferable that the main agent further contains a pigment and a solvent, and the crosslinking agent further contains a curing catalyst and a solvent. The crosslinking agent may further contain a surfactant.

Before use, the aqueous first colored coating composition (X) may be diluted to an appropriate viscosity by adding water and/or an organic solvent, etc., if necessary, and then applied.

The appropriate viscosity may vary depending on the coating formulation, but is typically, for example, in the range of about 20 to 60 seconds, and preferably about 25 to 50 seconds, as adjusted and measured at 20° C. using a No. 4 Ford viscosity cup.

The appropriate viscosity may vary depending on the coating formulation, but is typically, for example, in the range of about 20 to 60 seconds, and preferably about 25 to 50 seconds, as adjusted and measured at 20° C. using a No. 4 Ford viscosity cup.

The aqueous first colored coating composition (X) can be applied to a substrate by a known method, such as air spray coating, airless spray coating, rotary atomization coating, or curtain coating. An electrostatic charge may be applied during coating. Among these, air spray coating, rotary atomization coating, etc. are preferable. Such a coating method can be performed once or several times until the desired film thickness is obtained.

The aqueous first colored coating composition (X) is generally preferably applied to a cured film thickness of 5 to 40 μm, more preferably 7 to 35 μm, and still more preferably 10 to 30 μm.

The coating film of the aqueous first colored coating composition (X) can be cured, for example, by heating at 80 to 180° C., particularly 100 to 160° C., for about 10 to 40 minutes. Heat curing can be performed by known heating means, for example, by using hot air furnaces, electric furnaces, infrared induction heating furnaces, and like drying furnaces.

Step (2)

Subsequently, an aqueous second colored coating composition (Y) is applied to the coating layer of the aqueous first colored coating composition (X) (the first colored coating film) formed in step (1) described above.

Before applying the aqueous second colored coating composition (Y), the first colored coating film is preferably subjected to preheating (preliminary heating), air blowing, or the like under heating conditions in which the coating film is not substantially cured. In the present invention, "cured coating film" refers to a film in a dry-hard condition according to JIS K 5600-1-1, i.e., a film in a condition such that when the center of the coated surface is strongly pinched between the thumb and forefinger, no fingerprint impression is left on the coated surface and no shifting of the coating film is observed; or when the center of the coated surface is repeatedly quickly rubbed with a fingertip, no traces of rubbing are left on the coated surface. "Uncured coating film" refers to a film that has not yet reached a dry-hard condition as mentioned above, and includes a film in a set-to-touch condition and a film in a dry-to-touch condition.

The preheating temperature is preferably 40 to 120° C., more preferably 60 to 100° C., and still more preferably 70 to 90° C. The preheating time is preferably 30 seconds to 15 minutes, more preferably 1 to 12 minutes, and still more preferably 2 to 10 minutes. Air blowing can typically be performed by blowing either room-temperature air, or air heated to 25 to 80° C., over the coated substrate surface for 30 seconds to 15 minutes.

Before applying the aqueous second colored coating composition (Y), the first colored coating film is preferably adjusted usually to a solids content of 60 to 100 mass %, more preferably 80 to 100 mass %, and still more preferably 90 to 100 mass %, by preheating, air blowing, or like means.

The solids content of the first colored coating film can be determined by the following method:

first, an aqueous first colored coating composition (X) is applied to a substrate, and also applied to an aluminum foil whose mass ($W_1$) is measured beforehand. Subsequently, the coated aluminum foil is subjected to preheating or the like. Immediately before applying an aqueous second colored coating composition (Y), the aluminum foil is removed to measure the mass of the aluminum foil ($W_2$). Subsequently, the removed aluminum foil is dried at 110° C. for 60 minutes and allowed to cool to room temperature in a desiccator. The mass of the coated aluminum foil ($W_3$) is then measured. The solids content is calculated according to the following formula.

$$\text{Solids content (mass \%)} = \{(W_3 - W_1)/(W_2 - W_1)\} \times 100$$

Aqueous Second Colored Coating Composition (Y)

The aqueous second colored coating composition (Y) applied to the first colored coating film is generally intended to impart smoothness, designability, etc. to the substrate. For example, a coating composition obtained by dissolving or dispersing, in water, a resin component comprising a base resin (e.g., acrylic resins, polyester resins, alkyd resins, urethane resins, epoxy resins, silicon resins, etc., all containing crosslinkable functional groups such as carboxy groups and hydroxy groups) and a curing agent (e.g., amino resins, polyisocyanate compounds, etc.), together with pigments and other additives can be used.

Among these, thermosetting aqueous coating compositions containing a hydroxy-containing resin as the base resin and an amino resin, such as a melamine resin, or a (block) polyisocyanate compound as the crosslinking agent can be preferably used in view of the appearance, water resistance, etc. of the resulting multilayer coating film.

Preferable amounts of the crosslinking agent and the base resin as a resin component in the aqueous second colored coating composition (Y) are such that, based on the total solids content of the base material and the crosslinking agent, the base resin is present in an amount of 10 to 90 mass %, preferably 20 to 80 mass %, and more preferably 30 to 70 mass %, and the crosslinking agent is present in an amount of 10 to 60 mass %, preferably 15 to 50 mass %, and more preferably 15 to 40 mass %.

The pigment may be a coloring pigment, an extender pigment, an effect pigment, or the like. The aqueous second colored coating composition (Y) preferably contains, as at least one pigment, a color pigment and/or an effect pigment among the above pigments. These pigments can be used singly, or in a combination of two or more.

Examples of the color pigment include titanium oxide, zinc white, carbon black, molybdenum red, Prussian blue, cobalt blue, azo pigments, phthalocyanine pigments, quinacridone pigments, isoindoline pigments, threne pigments, perylene pigments, dioxazine pigments, diketopyrrolopyrrole pigments, and the like.

Examples of the extender pigment include clay, kaolin, barium sulfate, barium carbonate, calcium carbonate, talc, silica, alumina white, and the like. Among these, barium sulfate and talc are preferable for use.

Examples of the effect pigment include aluminium (such as vapor-deposited aluminum), copper, zinc, brass, nickel, aluminium oxide, mica, titanium-oxide- or iron-oxide-coated aluminium oxide, titanium-oxide- or iron-oxide-coated mica, glass flakes, holographic pigments, and the like. These effect pigments may be used singly, or in a combination of two or more. A preferable amount of the pigment is typically 1 to 300 mass %, and particularly 50 to 150 mass %, based on the total resin solids content of the aqueous second colored coating composition (Y).

If necessary, the aqueous second colored coating composition (Y) may further contain additives for coating compositions, such as thickeners, ultraviolet absorbers, light stabilizers, curing catalysts, antifoaming agents, plasticizers, organic solvents, surface control agents, and anti-settling agents.

In the same manner as the aqueous first colored coating composition (X), the aqueous second colored coating composition (Y) may contain a phosphoric acid compound (B) as explained above regarding the aqueous first colored coating composition (X). As with the aqueous first colored coating composition (X), due to the phosphoric acid compound (B) contained, the aqueous second colored coating composition (Y) has excellent effects such as wettability and viscosity development, and inhibits the formation of a mixed layer between coating film layers. Therefore, the multilayer coating film formed by the method of the present invention can have a further improved finished appearance (smoothness and distinctness of image). When an aqueous coating composition whose reactivity is promoted by an acid catalyst is used as the aqueous second colored coating composition (Y), the effect of the phosphate group in the phosphoric acid compound (B) enhances curability and adhesion of the resulting coating film, so that coating film performance, such as water resistance, can be further improved.

Further, when an effect coating composition containing, for example, a scale-like metal powder pigment, such as an aluminum pigment, is used as the aqueous second colored coating composition (Y), the surface-activating ability associated with wettability etc. makes the orientation of the effect pigment excellent in the second colored coating film. Therefore, a coating film having an excellent finished appearance with good metallic feel and no metallic mottling can be obtained. Accordingly, containing a phosphoric acid compound is particularly preferable when the aqueous second colored coating composition (Y) is an effect coating composition.

Before use, the aqueous second colored coating composition (Y) of the present invention may be diluted to an appropriate viscosity by adding water and/or an organic solvent, etc., if necessary, and then applied.

The appropriate viscosity may vary depending on the formulation of the coating composition, but is generally in the range of about 20 to 60 seconds, and preferably about 25 to 50 seconds, as adjusted and measured at 20° C. using Ford cup viscometer No. 4. Moreover, in the above, the coating solids concentration of the aqueous second colored coating composition is generally about 5 to 70 mass %, and preferably about 10 to 50 mass %.

The aqueous second colored coating composition (Y) may be a single-component coating composition or a multi-component coating composition. In view of storage stability, a multi-component coating composition may be formed as a two-component coating composition comprising a main agent containing a base resin, and a crosslinking agent. It is usually preferable that the main agent further contains a pigment and a solvent, and the crosslinking agent further contains a curing catalyst and a solvent. The crosslinking agent may further contain a surfactant.

The aqueous second colored coating composition (Y) can be applied to a substrate by a known methods, such as air spray coating, airless spray coating, rotary atomization coating, or curtain coating. An electrostatic charge may be applied during coating. Among these, air spray coating, rotary atomization coating, and like methods are preferable. Such a coating method can be performed once or several times until the desired film thickness is obtained.

The aqueous second colored coating composition (Y) is generally preferably applied to a cured film thickness of 5 to 40 μm, more preferably 7 to 30 μm, and still more preferably 10 to 25 μm.

The coating film of the aqueous second colored coating composition (Y) can be cured, for example, by heating at 80 to 180° C., particularly 100 to 160° C., for about 10 to 40 minutes. Heat curing can be performed by known heating means, for example, by using hot air furnaces, electric furnaces, infrared induction heating furnaces, and like drying furnaces.

Step (3)

In the method for forming a multilayer coating film of the present invention, a clear coating composition (Z) is applied to the coating film of the aqueous second colored coating composition (Y) (second, colored coating film) formed in step (2) above.

Before applying the clear coating composition (Z), the second colored coating film is preferably subjected to preheating, air blowing, or the like under heating conditions in which the coating film is not substantially cured. The preheating temperature is preferably 40 to 100° C., more preferably 50 to 90° C., and still more preferably 60 to 80° C. The preheating time is preferably 30 seconds to 15 minutes, more preferably 1 to 10 minutes, and still more preferably 2 to 5 minutes. Air blowing can be performed, for example, by blowing either room temperature air, or air heated to 25 to 80° C., over the coated surface of the substrate for 30 seconds to 15 minutes.

Before applying the clear coating composition (Z), the second colored coating film is generally preferably adjusted to a solids content of 70 to 100 mass %, more preferably 80 to 100 mass %, and still more preferably 90 to 100 mass %, if necessary, by preheating, air blowing, etc. as mentioned above.

As the clear coating composition (Z), any known thermosetting clear coating composition for coating vehicle bodies etc. can be used. Examples of such thermosetting clear coating compositions include organic-solvent-type thermosetting coating compositions, aqueous thermosetting coating compositions, and powder thermosetting coating compositions, all of which contain a crosslinking agent and a base resin having a crosslinkable functional group.

Examples of crosslinkable functional groups contained in base resins include carboxyl, hydroxyl, epoxy, silanol, and the like. Examples of base resins include acrylic resin, polyester resin, alkyd resin, urethane resin, epoxy resin, fluororesin, and the like. Examples of crosslinking agents include polyisocyanate compounds, blocked polyisocyanate compounds, melamine resins, urea resins, carboxy-containing compounds, carboxy-containing resins, epoxy-containing resins, epoxy-containing compounds, and the like.

Examples of preferable combinations of a base resin and a crosslinking agent for clear coating composition (Z) include carboxy-containing resin/epoxy-containing resin, hydroxy-containing resin/polyisocyanate compound, hydroxy-containing resin/blocked polyisocyanate compound, hydroxy-containing resin/melamine resin, and like base resin/crosslinking agent combinations.

The clear coating composition (Z) may be a single-component coating composition, or a multiple-component coating composition, such as a two-component urethane resin coating composition.

Further, the clear coating composition (Z) may contain a color pigment, an extender pigment, an effect pigment, a dye, etc., if necessary, as long as the transparency is not impaired. The clear coating composition may further suitably contain an ultraviolet absorber, a light stabilizer, an antifoaming agent, a thickener, an anticorrosive, a surface control agent, and the like.

The clear coating composition (Z) can be applied to the surface coated with aqueous second colored coating composition (Y) by a known method such as airless spray coating, air spray coating, or rotary atomization coating. An electrostatic charge may be applied during coating. The clear coating composition (Z) can generally be applied to a cured film thickness of 20 to 80 µm, preferably 25 to 60 µm, and more preferably 30 to 50 µm.

After applying the clear coating composition (Z), if necessary, an interval of about 1 to 60 minutes may be set at room temperature, or preheating may be performed at about 50 to 110° C. for about 1 to 30 minutes.

Step (4)

In the method for forming a multilayer coating film of the present invention, the uncured first colored coating film, uncured second coating film, and uncured clear coating film formed in steps (1) to (3) are simultaneously bake-cured.

The first colored coating film, the second colored coating film, and the clear coating film are cured by a general coating-film-baking method, such as hot-air heating, infrared heating, or high-frequency heating. The heating temperature is preferably 80 to 180° C., more preferably 110 to 170° C., and still more preferably 130 to 160° C. The heating time is preferably 10 to 90 minutes, and more preferably 15 to 60 minutes. This heating allows the three layers for forming the multilayer coating film, i.e., the first colored coating film, second colored coating film, and clear coating film, to be simultaneously cured.

As described above, the coating composition of the present invention is applied to a substrate and then cured to form a coating film. Therefore, the present invention also provides an article having a coating film obtained by curing the coating composition of the present invention (e.g., vehicles and parts thereof).

EXAMPLES

The present invention is described in further detail below with reference to Examples and Comparative Examples. However, the present invention is not limited to only these Examples. Note that "parts" and "%" are expressed on a mass basis.

Production of Acrylic Resin Particles (A1-1)

Production Example 3

130 parts of deionized water and 0.52 parts of Aqualon KH-10 (Note 1) were placed in a reaction vessel equipped with a thermometer, a thermostat, a stirrer, a reflux condenser, and a dropping funnel. The mixture was stirred and mixed in a nitrogen stream, and heated to 80° C. Subsequently, 1% of the total amount of a monomer emulsion 1 described below and 5.3 parts of a 6% ammonium persulfate aqueous solution were introduced into the reaction vessel, and maintained at 80° C. for 15 minutes. The rest of the monomer emulsion 1 was then added dropwise to the reaction vessel over 3 hours while the reaction vessel was maintained at the same temperature. After completion of the dropwise addition, the mixture was aged for 1 hour. Thereafter, a monomer emulsion 2 described below was added dropwise over 1 hour, and the mixture was aged for 1 hour. Then, while 40 parts of a 5% dimethylethanolamine aqueous solution was gradually added to the reaction vessel, the mixture was cooled to 30° C., and filtered through a 100-mesh nylon cloth to obtain acrylic resin particles (A1-1-1) having an average particle size of 108 nm (as measured at 20° C. using a "COULTER N4" submicron particle size distribution analyzer (produced by Beckman Coulter, Inc.) in a state diluted with deionized water), a solids concentration of 30%, an acid value of 33 mg KOH/g, and a hydroxy value of 25 mg KOH/g.

(Note 1) Aqualon KH-10: an ammonium salt of polyoxyethylene alkyl ether sulfate ester, produced by Dai-ichi Kogyo Seiyaku Co., Ltd.; active ingredient: 97%

Monomer emulsion 1: The monomer emulsion 1 was obtained by mixing and stirring 42 parts of deionized water, 0.72 parts of Aqualon KH-10, 2.1 parts of methylenebis acrylamide, 2.8 parts of styrene, 16.1 parts of methyl methacrylate, 38 parts of ethyl acrylate, and 11 parts of n-butyl acrylate.

Monomer emulsion 2: The monomer emulsion 2 was obtained by mixing and stirring 18 parts of deionized water, 0.31 parts of Aqualon KH-10 (Note 2), 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 10.8 parts of n-butyl acrylate.

Production Examples 2 to 4

Acrylic resin particles (A1-1-2) to (A1-1-4) were obtained in the same manner as in Production Example 1, except that the formulation was changed to those shown in Table 1 below. Table 1 shows the solids concentration, acid value, hydroxy value, and average particle size (as measured at 20° C. using a "COULTER N4" submicron particle size distribution analyzer (produced by Beckman Coulter, Inc.) in a state diluted with deionized water) of the acrylic resin particles (A1-1-1) to (A1-1-4) obtained in these Production Examples and in Production Example 1.

TABLE 1

|  |  | Production Example | | | |
|---|---|---|---|---|---|
|  |  | 1 | 2 | 3 | 4 |
| Acrylic resin particles (A1-1) | | A1-1-1 | A1-1-2 | A1-1-3 | A1-1-4 |
| Deionized water | | 130 | | | |
| Aqualon KH-10 (Note 1) | | 0.52 | | | |
| Deionized water | | 5 | | | |
| Ammonium persulfate | | 0.3 | | | |
| Monomer emulsion 1 | Deionized water | 42 | | | |
|  | Aqualon KH-10 (Note 1) | 0.72 | | | |
|  | Allyl methacrylate | | | 2.1 | |
|  | Methylenebisacrylamide | 2.1 | 2.1 | | 4.8 |
|  | Styrene | 2.8 | 2.8 | 2.8 | 2.8 |
|  | Methyl methacrylate | 16.1 | 16.1 | 16.1 | 13.4 |
|  | Ethyl acrylate | 38 | 38 | 38 | 38 |
|  | n-Butyl acrylate | 11 | 11 | 11 | 11 |
| Monomer emulsion 2 | Deionized water | 18 | | | |
|  | Aqualon KH-10 (Note 1) | 0.31 | | | |
|  | Ammonium persulfate | 0.03 | | | |
|  | Methacrylic acid | 5.1 | 5.1 | 5.1 | 5.1 |
|  | 2-Hydroxyethyl acrylate | 5.1 | 5.1 | 5.1 | 1.1 |
|  | 2-Ethylhexyl acrylate | | | 3 | |
|  | Styrene | 3 | | 3 | |
|  | Methyl methacrylate | 6 | 6 | 6 | 13 |
|  | n-Butyl acrylate | 10.8 | 10.8 | 10.8 | 10.8 |
| 5% dimethylethanolamine aqueous solution | | 40 | | | |
| Solids concentration (mass %) | | 30 | | | |
| Acid value (mg KOH/g) | | 33 | 33 | 33 | 33 |
| Hydroxy value (mg KOH/g) | | 25 | 25 | 25 | 5 |
| Average particle size (nm) | | 108 | 106 | 105 | 103 |

Production of Water-Soluble Acrylic Resin (A2)

Production Example 7

30 parts of propylene glycol monopropyl ether was placed in a reaction vessel equipped with a thermometer, a thermostat, a stirrer, a reflux condenser, a nitrogen inlet tube, and a dropping funnel, and heated to 85° C. Then, a mixture of 10 parts of styrene, 30 parts of methyl methacrylate, 15 parts of 2-ethylhexyl acrylate, 11.5 parts of n-butyl acrylate, 30 parts of hydroxyethyl acrylate, 3.5 parts of acrylic acid, 10 parts of propylene glycol monopropyl ether, and 2 parts of 2,2'-azobis(2,4-dimethylvaleronitrile) was added dropwise to the flask over 4 hours. After completion of the dropwise addition, the mixture was aged for 1 hour. Thereafter, a mixture of 5 parts of propylene glycol monopropyl ether and 1 part of 2,2'-azobis(2,4-dimethylvaleronitrile) was further added dropwise to the flask over 1 hour. After completion of the dropwise addition, the mixture was aged for 1 hour. Further, 3.03 parts of 2-(dimethylamino)ethanol was added and deionized water was gradually added to obtain a water-soluble acrylic resin (A2-1) having a solids concentration of 40%. The obtained water-soluble acrylic resin (A2-1) had an acid value of 27 mg KOH/g and a hydroxy value of 145 mg KOH/g.

Production Example 6

30 parts of propylene glycol monopropyl ether was placed in a reaction vessel equipped with a thermometer, a thermostat, a stirrer, a reflux condenser, a nitrogen inlet tube, and a dropping funnel, and heated to 85° C. Then, a mixture of 10 parts of styrene, 55 parts of methyl methacrylate, 15 parts of 2-ethylhexyl acrylate, 11.5 parts of n-butyl acrylate, 5 parts of hydroxyethyl acrylate, 3.5 parts of acrylic acid, 10 parts of propylene glycol monopropyl ether, and 2.3 parts of 2,2'-azobis(2,4-dimethylvaleronitrile) was added dropwise to the flask over 4 hours. After completion of the dropwise addition, the mixture was aged for 1 hour. Thereafter, a mixture of 5 parts of propylene glycol monopropyl ether and 1 part of 2,2'-azobis(2,4-dimethylvaleronitrile) was further added dropwise to the flask over 1 hour. After completion of the dropwise addition, the mixture was aged for 1 hour. Further, 3.03 parts of 2-(dimethylamino)ethanol was added and deionized water was gradually added to obtain a water-soluble acrylic resin (A2-2) having a solids concentration of 40%. The obtained water-soluble acrylic resin (A2-2) had an acid value of 27 mg KOH/g and a hydroxy value of 24 mg KOH/g.

Production of Polyester Resin (A3)

Production Example 7

109 parts of trimethylolpropane, 141 parts of 1,6-hexanediol, 126 parts of hexahydrophthalic anhydride, and 120 parts of adipic acid were placed in a reaction vessel equipped with a stirrer, a reflux condenser, a water separator, and a thermometer. After the temperature was increased from 160° C. to 230° C. over 3 hours, a condensation reaction was performed at 230° C. for 4 hours. Subsequently, in order to add carboxyl groups to the resulting condensation reaction product, 38.3 parts of trimellitic anhydride was further added, and allowed to react at 170° C. for 30 minutes. The reaction product was then diluted with ethylene glycol mono-2-ethylhexyl ether (mass dissolved in 100 g of water at 20° C.: 3.4 g), thereby obtaining a water-soluble polyester resin (A3-1) having an acid value of 46 mg KOH/g, a hydroxy value of 150 mg KOH/g, a solids concentration of 70%, and a weight average molecular weight of 6,400.

Production of Aqueous First Colored Coating Composition (X)

Production Example 8

51 parts of the water-soluble acrylic resin (A2-1) obtained in Production Example 5 (resin solids content: 20.4 parts), 87 parts of rutile titanium dioxide (trade name JR-806, produced by Tayca Corporation), 0.8 parts of carbon black (trade name Carbon Ma-100, produced by Mitsubishi Chemical, Inc.), and 50 parts of deionized water were mixed and adjusted to a pH of 8.0 with 2-(dimethylamino)ethanol.

The resulting mixture was then dispersed with a paint shaker for 30 minutes to obtain a pigment-dispersed paste.

Subsequently, 189 parts of the obtained pigment-dispersed paste, 83.3 parts of acrylic resin particles obtained in Production Example 1 (resin solids content: 25 parts), 75 parts of a polyurethane resin (A4-1) (a urethane resin emulsion (trade name U-Coat UX-485, a polycarbonate-based urethane resin emulsion, solids content: 40%, produced by Sanyo Chemical Industries, Ltd.)) (resin solids content: 30 parts), 35.7 parts of a crosslinking agent (C1) (a methyl etherified melamine resin, weight average molecular weight: 800, solids content: 70%) (resin solids content: 25 parts), and 2 parts of a phosphoric acid compound (B1) (Note 2) were uniformly mixed.

Subsequently, ASE-60 (an alkaline swelling thickener, trade name, produced by Rohm & Haas Co.), 2-(dimethyl-amino)ethanol, and deionized water were added to the obtained mixture to obtain an aqueous first colored coating composition (X1) with a pH of 8.2, a coating solids concentration of 44%, and a viscosity of 30 seconds as measured at 20° C. using a No. 4 Ford cup.

(Note 2) Phosphoric acid compound (B1): in Formula (1), $R^1$ is $C_3$ linear alkyl, $R^2$ is ethylene, and n is 1; number average molecular weight: 227, HLB: 15 or more (an estimated value, because it cannot be calculated by the Griffin method). Note that m is 1 or 2, and the ratio of the monoester wherein m is 1 and the diester wherein m is 2 is 1:1.

Examples 9 to 43

Aqueous first colored coating compositions (X2) to (X36), which had a pH of 8.2, a coating solids concentration of 44%, and a viscosity of 30 seconds as measured at 20° C. using a No. 4 Ford cup, were each obtained in the same manner as in Example 8, except that the formulation of Example 1 was changed as shown in Table 2 below.

In the aqueous first colored coating composition (X27) of Production Example 34, the water-soluble acrylic resin (A2-2) obtained in Production Example 6 was used as a resin for the pigment-dispersed paste.

The phosphoric acid compounds (B2) to (B21) shown in Table 2 below, polyol A, polyol B, and crosslinking agent (C2) are as follows. Note that in Formula (1) of all of the phosphoric acid compounds (B2) to (B21), m is 1 or 2, and the ratio of the monoester wherein m is 1 and the diester wherein m is 2 is 1:1.

Aqueous first colored coating compositions (X32) to (X36) are coating compositions for Comparative Examples.

(Note 3) Phosphoric acid compound (B2): in Formula (1), $R^1$ is $C_3$ branched alkyl, $R^2$ is ethylene, and n is 1; number average molecular weight: 227, HLB: 15 or more (an estimated value, because it cannot be calculated by the Griffin method)

(Note 4) Phosphoric acid compound (B3): in Formula (1), $R^1$ is $C_6$ linear alkyl, $R^2$ is ethylene, and n is 1; number average molecular weight: 290, HLB: 6.0

(Note 5) Phosphoric acid compound (B4): in Formula (1), $R^1$ is $C_6$ branched alkyl, $R^2$ is ethylene, and n is 1; number average molecular weight: 290, HLB: 6.0.

(Note 6) Phosphoric acid compound (B5): in Formula (1), $R^1$ is $C_7$ linear alkyl, $R^2$ is ethylene, and n is 1; number average molecular weight: 311, HLB: 5.5

(Note 7) Phosphoric acid compound (B6): in Formula (1), $R^1$ is $C_7$ branched alkyl, $R^2$ is ethylene, and n is 1; number average molecular weight: 311, HLB: 5.5

(Note 8) Phosphoric acid compound (B7): in Formula (1), $R^1$ is $C_8$ linear alkyl, $R^2$ is ethylene, and n is 1; number average molecular weight: 332, HLB: 5.1

(Note 9) Phosphoric acid compound (B8): in Formula (1), $R^1$ is $C_8$ branched alkyl, $R^2$ is ethylene, and n is 1; number average molecular weight: 332, HLB: 5.1

(Note 10) Phosphoric acid compound (B9): in Formula (1), $R^1$ is $C_9$ linear alkyl, $R^2$ is ethylene, and n is 1; number average molecular weight: 353, HLB: 4.7

(Note 11) Phosphoric acid compound (B10): in Formula (1), $R^1$ is $C_9$ branched alkyl, $R^2$ is ethylene, and n is 1; number average molecular weight: 353, HLB: 4.7

(Note 12) Phosphoric acid compound (B11): in Formula (1), $R^1$ is $C_{12}$ linear alkyl, $R^2$ is ethylene, and n is 1; number average molecular weight: 482, HLB: 6.4

(Note 13) Phosphoric acid compound (B12): in Formula (1), $R^1$ is $C_{18}$ linear alkyl, $R^2$ is ethylene, and n is 1; number average molecular weight: 674, HLB: 6.6

(Note 14) Phosphoric acid compound (B13): in Formula (1), $R^1$ is $C_7$ branched alkyl, and n is 0; number average molecular weight: 245, HLB: 5 or less (an estimated value, because it cannot be calculated by the Griffin method)

(Note 15) Phosphoric acid compound (B14): in Formula (1), $R^1$ is $C_7$ branched alkyl, $R^2$ is ethylene, and n is 3; number average molecular weight: 443, HLB: 10.6

(Note 16) Phosphoric acid compound (B15): in Formula (1), $R^1$ is $C_7$ branched alkyl, $R^2$ is ethylene, and n is 5; number average molecular weight: 575, HLB: 13.1

(Note 17) Phosphoric acid compound (B16): in Formula (1), $R^1$ is $C_7$ branched alkyl, $R^2$ is ethylene, and n is 10; number average molecular weight: 905, HLB: 15.8

(Note 18) Phosphoric acid compound (B17): in Formula (1), $R^1$ is $C_8$ branched alkyl, and n is 0; number average molecular weight 266, HLB: 5 or less (an estimated value, because it cannot be calculated by the Griffin method)

(Note 19) Phosphoric acid compound (B18): in Formula (1), $R^1$ is $C_8$ branched alkyl, $R^2$ is ethylene, and n is 3; number average molecular weight: 464, HLB: 10.1

(Note 20) Phosphoric acid compound (B19): in Formula (1), $R^1$ is $C_8$ branched alkyl, $R^2$ is ethylene, and n is 5; number average molecular weight: 596, HLB: 12.6

(Note 21) Phosphoric acid compound (B20): in Formula (1), $R^1$ is $C_1$ linear alkyl, $R^2$ is ethylene, and n is 1; average molecular weight: 185, HLB: 15 or more (an estimated value, because it cannot be calculated by the Griffin method)

(Note 22) Phosphoric acid compound (B21): in Formula (1), $R^1$ is $C_{21}$ linear alkyl, $R^2$ is ethylene, and n is 7; number average molecular weight: 1001, HLB: 9.9.

(Note 23) Polyol A (polyethylene glycol, solids content: 100%, hydroxy value: 187, number average molecular weight: about 600)

(Note 24) Polyol B (polyester polyol, solids content: 100%, hydroxy value: 235, number average molecular weight: about 480)

(Note 25) Crosslinking agent (C2): a blocked polyisocyanate compound, "Bayhydur VPLS2310," trade name, produced by Sumika Bayer Urethane Co., Ltd.; solids content: 38%

Although it is not shown in Table 2, all of the aqueous first colored coating compositions (X1) to (X36) contain 87 parts of rutile titanium dioxide (trade name JR-806, produced by Tayca Corporation) and 0.8 parts of carbon black (trade name Carbon Ma-100, produced by Mitsubishi Chemical, Inc.).

TABLE 2

| | | Aqueous first colored coating composition (X) | Acrylic resin particles (A1-1-) | | Water-soluble acrylic resin (A2-) | | Other film-forming resin (A) | | Crosslinking agent (C) | |
|---|---|---|---|---|---|---|---|---|---|---|
| | | | Type | Amount | Type | Amount | Type | Amount | Type | Amount |
| Production Example | 8 | X1 | 1 | 83.3 | 1 | 51 | A4-1 | 75 | C1 | 35.7 |
| | 9 | X2 | 1 | 83.3 | 1 | 51 | A4-1 | 75 | C1 | 35.7 |
| | 10 | X3 | 1 | 83.3 | 1 | 51 | A4-1 | 75 | C1 | 35.7 |
| | 11 | X4 | 1 | 83.3 | 1 | 51 | A4-1 | 75 | C1 | 35.7 |
| | 12 | X5 | 1 | 83.3 | 1 | 51 | A4-1 | 75 | C1 | 35.7 |
| | 13 | X6 | 1 | 83.3 | 1 | 51 | A4-1 | 75 | C1 | 35.7 |
| | 14 | X7 | 1 | 83.3 | 1 | 51 | A4-1 | 75 | C1 | 35.7 |
| | 15 | X8 | 1 | 83.3 | 1 | 51 | A4-1 | 75 | C1 | 35.7 |
| | 16 | X9 | 1 | 83.3 | 1 | 51 | A4-1 | 75 | C1 | 35.7 |
| | 17 | X10 | 1 | 83.3 | 1 | 51 | A4-1 | 75 | C1 | 35.7 |
| | 18 | X11 | 1 | 83.3 | 1 | 51 | A4-1 | 75 | C1 | 35.7 |
| | 19 | X12 | 1 | 83.3 | 1 | 51 | A4-1 | 75 | C1 | 35.7 |
| | 20 | X13 | 1 | 83.3 | 1 | 51 | A4-1 | 75 | C1 | 35.7 |
| | 21 | X14 | 1 | 83.3 | 1 | 51 | A4-1 | 75 | C1 | 35.7 |
| | 22 | X15 | 1 | 83.3 | 1 | 51 | A4-1 | 75 | C1 | 35.7 |
| | 23 | X16 | 1 | 83.3 | 1 | 51 | A4-1 | 75 | C1 | 35.7 |
| | 24 | X17 | 1 | 83.3 | 1 | 51 | A4-1 | 75 | C1 | 35.7 |
| | 25 | X18 | 1 | 83.3 | 1 | 51 | A4-1 | 75 | C1 | 35.7 |
| | 26 | X19 | 1 | 83.3 | 1 | 51 | A4-1 | 75 | C1 | 35.7 |
| | 27 | X20 | 1 | 83.3 | 1 | 51 | A4-1 | 75 | C1 | 35.7 |
| | 28 | X21 | 1 | 83.3 | 1 | 51 | A4-1 | 75 | C1 | 35.7 |
| | 29 | X22 | 1 | 83.3 | 1 | 51 | A4-1 | 75 | C1 | 35.7 |
| | 30 | X23 | 1 | 83.3 | 1 | 51 | A4-1 | 75 | C1 | 35.7 |
| | 31 | X24 | 1 | 83.3 | 1 | 51 | A4-1 | 75 | C1 | 35.7 |
| | 32 | X25 | 2 | 83.3 | 1 | 51 | A4-1 | 75 | C1 | 35.7 |
| | 33 | X26 | 3 | 83.3 | 1 | 51 | A4-1 | 75 | C1 | 35.7 |
| | 34 | X27 | 4 | 133 | 2 | 51 | A4-1 | 100 | | |
| | 35 | X28 | 1 | 83.3 | 1 | 51 | A3-1 | 42.9 | C1 | 35.7 |
| | 36 | X29 | 1 | 83.3 | 1 | 51 | A4-1 | 75 | C2 | 66 |
| | 37 | X30 | 1 | 133 | 1 | 51 | A3-1 | 14.3 | C2 | 79 |
| | 38 | X31 | 1 | 100 | 1 | 51 | A4-1 | 37.5 | C1 | 50 |
| Production Example | 39 | X32 | 1 | 83.3 | 1 | 51 | A4-1 | 75 | C1 | 35.7 |
| | 40 | X33 | 1 | 83.3 | 1 | 51 | A4-1 | 75 | C1 | 35.7 |
| | 41 | X34 | 1 | 83.3 | 1 | 51 | A4-1 | 75 | C1 | 35.7 |
| | 42 | X35 | 1 | 83.3 | 1 | 51 | A4-1 | 75 | C1 | 35.7 |
| | 43 | X36 | 1 | 83.3 | 1 | 51 | A4-1 | 75 | C1 | 35.7 |

| | | | Phosphoric acid compound (B) | | | | | | |
|---|---|---|---|---|---|---|---|---|---|
| | | | R1 | | R2 | | | | |
| | | Type | Number of carbon atoms | Structure | Number of carbon atoms | n | Average molecular weight | HLB | Amount |
| Production Example | 8 | B1 | 3 | Linear | 2 | 1 | 227 | 15 or more | 2 |
| | 9 | B2 | 3 | Branched | 2 | 1 | 227 | 15 or more | 2 |
| | 10 | B3 | 6 | Linear | 2 | 1 | 290 | 6.0 | 2 |
| | 11 | B4 | 6 | Branched | 2 | 1 | 290 | 6.0 | 2 |
| | 12 | B5 | 7 | Linear | 2 | 1 | 311 | 5.5 | 2 |
| | 13 | B6 | 7 | Branched | 2 | 1 | 311 | 5.5 | 1 |
| | 14 | B6 | 7 | Branched | 2 | 1 | 311 | 5.5 | 2 |
| | 15 | B6 | 7 | Branched | 2 | 1 | 311 | 5.5 | 4 |
| | 16 | B7 | 8 | Linear | 2 | 1 | 332 | 5.1 | 2 |
| | 17 | B8 | 8 | Branched | 2 | 1 | 332 | 5.1 | 2 |
| | 18 | B9 | 9 | Linear | 2 | 1 | 353 | 4.7 | 2 |
| | 19 | B10 | 9 | Branched | 2 | 1 | 353 | 4.7 | 2 |
| | 20 | B11 | 12 | Linear | 2 | 2 | 482 | 6.4 | 2 |
| | 21 | B12 | 18 | Linear | 2 | 3 | 674 | 6.6 | 2 |
| | 22 | B13 | 7 | Branched | | 0 | 245 | 5 or less | 2 |
| | 23 | B14 | 7 | Branched | 2 | 3 | 443 | 10.6 | 2 |
| | 24 | B15 | 7 | Branched | 2 | 5 | 575 | 13.1 | 2 |
| | 25 | B16 | 7 | Branched | 2 | 10 | 905 | 15.8 | 2 |
| | 26 | B17 | 8 | Branched | | 0 | 266 | 5 or less | 2 |
| | 27 | B18 | 8 | Branched | 2 | 3 | 464 | 10.1 | 2 |
| | 28 | B19 | 8 | Branched | 2 | 5 | 596 | 12.6 | 2 |
| | 29 | | Blend of B6 and B13 (1/1) | | | | | | 2 |

TABLE 2-continued

|  | # | Code | | Type | | | | | |
|---|---|---|---|---|---|---|---|---|---|
|  | 30 | | | Blend of B13 and B14 (1/1) | | | | | 2 |
|  | 31 | | | Blend of B8 and B17 (1/1) | | | | | 2 |
|  | 32 | B6 | 7 | Branched | 2 | 1 | 311 | 5.5 | 2 |
|  | 33 | B6 | 7 | Branched | 2 | 1 | 311 | 5.5 | 2 |
|  | 34 | B6 | 7 | Branched | 2 | 1 | 311 | 5.5 | 2 |
|  | 35 | B6 | 7 | Branched | 2 | 1 | 311 | 5.5 | 2 |
|  | 36 | B6 | 7 | Branched | 2 | 1 | 311 | 5.5 | 2 |
|  | 37 | B6 | 7 | Branched | 2 | 1 | 311 | 5.5 | 2 |
|  | 38 | B6 | 7 | Branched | 2 | 1 | 311 | 5.5 | 2 |
| Production Example | 39 | | | | | | | | |
|  | 40 | Polyol A | | | | | 600 | | 2 |
|  | 41 | Polyol B | | | | | 480 | | 2 |
|  | 42 | B20 | 1 | Linear | 2 | 1 | 185 | 15 or more | 2 |
|  | 43 | B21 | 21 | Linear | 2 | 7 | 1001 | 9.9 | 2 |

Production of Aqueous Second Colored Coating Composition (Y)

Production Example 44

100 parts (solids content: 30 parts) of the hydroxy-containing acrylic resin dispersion (a) described below, 73 parts (solids content: 40 parts) of the hydroxy-containing water-soluble acrylic resin (b) described below, 50 parts of a methyl-butyl mixed etherified melamine resin (solids content: 60%, weight average molecular weight: 2,000), and 64 parts of the effect pigment concentrate (P1) described below were uniformly mixed. Further, deionized water and 2-(dimethylamino)ethanol were added, thereby obtaining an aqueous second colored coating composition (Y1) having a pH of 8.0 and a solids concentration of 23%.

Hydroxy-Containing Acrylic Resin Dispersion (A):

130 parts of deionized water and 0.52 parts of Aqualon KH-10 (trade name, produced by Dai-ichi Kogyo Seiyaku Co., Ltd., an ammonium salt of polyoxyethylene alkyl ether sulfate ester, active ingredient: 97%) were placed in a reaction vessel equipped with a thermometer, a thermostat, a stirrer, a reflux condenser, a nitrogen inlet tube, and a dropping funnel. The mixture was stirred and mixed in a nitrogen stream, and heated to 80° C. Subsequently, 1% of the total amount of a monomer emulsion (1) described below and 5.3 parts of a 6% ammonium persulfate aqueous solution were introduced into the reaction vessel, and maintained at 80° C. for 15 minutes. The rest of the monomer emulsion (1) was then added dropwise to the reaction vessel over 3 hours while the reactor was maintained at the same temperature. After completion of the dropwise addition, the mixture was aged for 1 hour. Thereafter, a monomer emulsion (2) described below was added dropwise over 1 hour, and the mixture was aged for 1 hour. Then, while 40 parts of a 5% 2-(dimethylamino)ethanol aqueous solution was gradually added to the reaction vessel, the mixture was cooled to 30° C., and filtered through a 100-mesh nylon cloth to obtain as the filtrate a hydroxy-containing acrylic resin dispersion (a) having a solids concentration of 30% and an average particle size of 120 nm (as measured at 20° C. using a "COULTER N4" submicron particle size distribution analyzer (produced by Beckman Coulter, Inc.) in a state diluted with deionized water). The obtained hydroxy-containing acrylic resin dispersion (a) had an acid value of 33 mg KOH/g and a hydroxy value of 25 mg KOH/g.

Monomer emulsion (1): The monomer emulsion (1) was obtained by mixing and stirring 42 parts of deionized water, 0.72 parts of Aqualon KH-10, 2.1 parts of methylene bisacrylamide, 2.8 parts of styrene, 16.1 parts of methyl methacrylate, 28 parts of ethyl acrylate, and 21 parts of n-butyl acrylate.

Monomer emulsion (2): The monomer emulsion (1) was obtained by mixing and stirring 18 parts of deionized water, 0.31 parts of Aqualon KH-10, 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate.

Hydroxy-Containing Water-Soluble Acrylic Resin (B):

35 parts of propylene glycol monopropyl ether was placed in a flask, and heated to 85° C. Then, a mixture of 30 parts of methyl methacrylate, 20 parts of 2-ethylhexyl acrylate, 29 parts of n-butyl acrylate, 15 parts of hydroxyethyl acrylate, 6 parts of acrylic acid, 15 parts of propylene glycol monopropyl ether, and 2.3 parts of 2,2'-azobis(2,4-dimethylvaleronitrile) was added dropwise to the flask over 4 hours. After completion of the dropwise addition, the mixture was aged for 1 hour. Thereafter, a mixture of 10 parts of propylene glycol monopropyl ether and 1 part of 2,2'-azobis(2,4-dimethylvaleronitrile) was further added dropwise to the flask over 1 hour. After completion of the dropwise addition, the mixture was aged for 1 hour. Further, 7.4 parts of diethanolamine was added, thereby obtaining a hydroxy-containing water-soluble acrylic resin solution (b) having a solids concentration of 55%, an acid value of 47 mg KOH/g, and a hydroxy value of 72 mg KOH/g.

Effect Pigment Concentrated Solution (P1):

In a stirring-mixing vessel, 11 parts of aluminum pigment paste "GX-40A" (produced by Asahi Kasei Metals Co., Ltd., metal content: 74%), 10 parts of aluminum pigment paste "MH-8805" (produced by Asahi Kasei Metals Co., Ltd., metal content: 68%), 35 parts of ethylene glycol mono-2-ethylhexyl ether, 8 parts of a phosphate group-containing resin solution (*), and 0.2 parts of 2-(dimethylamino)ethanol were uniformly mixed, thereby obtaining an effect pigment concentrated solution (P1).

Phosphate Group-Containing Resin Solution (*):

A mixed solvent of 27.5 parts of methoxy propanol and 27.5 parts of isobutanol was placed in a reaction vessel equipped with a thermometer, a thermostat, a stirrer, a reflux condenser, and a dropping funnel, and heated to 110° C. Then, 121.5 parts of a mixture of 25 parts of styrene, 27.5 parts of n-butyl methacrylate, 20 parts of "Isostearyl Acrylate" (trade name, produced by Osaka Organic Chemical Industry Ltd., a branched higher alkyl acrylate), 7.5 parts of 4-hydroxybutyl acrylate, 15 parts of a phosphate group-containing polymerizable monomer (**), 12.5 parts of 2-methacryloyloxyethyl acid phosphate, 10 parts of isobutanol, and 4 parts of t-butylperoxyoctanoate was added to the mixed solvent over 4 hours. Further, a mixture of 0.5 parts of t-butylperoxyoctanoate and 20 parts of isopropanol was added dropwise for 1 hour. Thereafter, the mixture was stirred and aged for 1 hour, thereby obtaining a phosphate group-containing resin solution having a solids concentration of 50%. The acid value of the present resin derived from the phosphate group of the resin was 83 mg KOH/g, the hydroxy value derived from the 4-hydroxybutyl acrylate was 29 mg KOH/g, and the weight average molecular weight was 10,000.

Phosphate Group-Containing Polymerizable Monomer (**):

57.5 parts of monobutyl phosphoric acid and 41 parts of isobutanol were placed in a reaction vessel equipped with a thermometer, a thermostat, a stirrer, a reflux condenser, and a dropping funnel, and heated to 90° C. After 42.5 parts of glycidyl methacrylate was added dropwise over 2 hours, the mixture was stirred and aged for 1 hour. Thereafter, 59 parts of isopropanol was added, thereby obtaining a phosphate group-containing polymerizable monomer solution having a solids concentration of 50%. The acid value of the obtained monomer derived from the phosphate group was 285 mg KOH/g.

Production Example 45

An aqueous second colored coating composition (Y2), which had a pH of 8.0 and a solids concentration of 23%, was obtained in the same manner as in Production Example 44 except that 79 parts of Bayhydur VPLS2310 (a blocked polyisocyanate compound, trade name, produced by Sumika Bayer Urethane Co., Ltd., solids content: 38%, the same compound as the above crosslinking agent (C2) (Note 25)) was used in place of the methyl-butyl mixed etherified melamine resin used in Production Example 44.

Production Example 46

An aqueous second colored coating composition (Y3), which had a pH of 8.0 and a solids concentration of 23%, was obtained in the same manner as in Production Example 44 except that 2 parts of a phosphoric acid compound (B6) (Note 7) was further added.

Method for Forming Coating Film (Production of Test Panel)

Test panels were produced in the following manner using each of the aqueous first colored coating compositions (X1) to (X36) obtained in Production Examples 8 to 43 and the aqueous second colored coating compositions (Y1) to (Y3) obtained in Production Examples 44 to 46, and evaluation tests were conducted.

(Production of Test Substrate)

"ELECRON GT-10" (trade name, produced by Kansai Paint Co., Ltd.; a thermosetting epoxy resin cationic electrodeposition coating composition) was applied by electrodeposition to a cold-rolled steel plate treated with zinc phosphate to a dry film thickness of 20 μm to prepare a test substrate.

Example 1

The aqueous first colored coating composition (X1) obtained in Production Example 8 was electrostatically applied to the test substrate using a rotary atomization electrostatic coating machine to a cured film thickness of 20 μm, and allowed to stand for 3 minutes. Then, preheating was performed at 80° C. for 3 minutes. Subsequently, the aqueous second colored coating composition (Y1) obtained in Production Example 44 was electrostatically applied to the uncured surface of the first colored coating film using the rotary atomization electrostatic coating machine to a cured film thickness of 15 μm, and allowed to stand for 5 minutes. Then, preheating was performed at 80° C. for 3 minutes.

Subsequently, a clear coating composition (Z1) (an acrylic resin/epoxy curing solvent-based top clear coating composition Magicron KINO-1210, trade name, produced by Kansai Paint Co., Ltd.) was applied to the uncured surface of the second colored coating film to a cured film thickness of 35 μm, and allowed to stand for 7 minutes. Then, the first colored coating film, the second colored coating film, and the clear coating film for forming a multilayer coating film were cured by heating at 140° C. for 30 minutes, thereby producing a test panel.

Examples 2 to 31 and Comparative Examples 1 to 5

Test panels were each produced in the same manner as in Example 1, except that aqueous first colored coating compositions (X2) to (X36) shown in Table 3 below were used in place of the aqueous first colored coating composition (X1) obtained in Production Example 8.

Example 32

A test panel was produced in the same manner as Example 7, except that a clear coating composition (Z2) (an acrylic melamine solvent-based clear coating composition Magicron TC-71, produced by Kansai Paint Co., Ltd.) was used in place of the clear coating composition (Z1) used in Example 7.

Comparative Example 6

A test panel was produced in the same manner as in Comparative Example 1 except that a clear coating composition (Z2) was used in place of the clear coating composition (Z1) used in Comparative Example 1.

Example 33

A test panel was produced in the same manner as in Example 7 except that a clear coating composition (Z3) (an acrylic isocyanate solvent-based clear coating composition, Magicron KINO#6000, produced by Kansai Paint Co., Ltd.) was used in place of the clear coating composition (Z1) used in Example 7.

Comparative Example 7

A test panel was produced in the same manner as in Comparative Example 1 except that a clear coating composition (Z3) was used in place of the clear coating composition (Z1) used in Comparative Example 7.

Example 34

A test panel was produced in the same manner as in Example 7 except that an aqueous first colored coating composition (X2) was used in place of the aqueous first colored coating composition (X1) used in Example 7.

Example 35

A test panel was produced in the same manner as in Example 7 except that an aqueous second colored coating composition (Y3) was used in place of the aqueous second colored coating composition (Y1) used in Example 7.

Comparative Example 8

A test panel was produced in the same manner as in Comparative Example 1 except that an aqueous second colored coating composition (Y2) was used in place of the aqueous second colored coating composition (Y1) used in Comparative Example 1.

Evaluation Test

The test panels obtained in Examples 1 to 35 and Comparative Examples 1 to 8 were each evaluated by the test methods described below. Table 3 also shows the evaluation results.

The test panels of Example 7 and Example 35 were further evaluated for metallic feel (IV value) and metallic mottling.

TABLE 3

|  |  | Aqueous first coating composition (X) | Aqueous second coating composition (Y) | Clear coating composition (Z) | Test results |  |  |  |  |  |
|---|---|---|---|---|---|---|---|---|---|---|
|  |  |  |  |  |  | Distinctness of image |  | Metallic feel IV value | Metallic mottling | Water resistance |
|  |  |  |  |  | Smoothness | Initial | After storage |  |  |  |
| Example | 1 | X1 | Y1 | Z1 | 11.1 | 14.6 | 19.3 |  |  | A |
|  | 2 | X2 | Y1 | Z1 | 11.5 | 13.3 | 17.2 |  |  | A |
|  | 3 | X3 | Y1 | Z1 | 11.8 | 10.9 | 13.9 |  |  | S |
|  | 4 | X4 | Y1 | Z1 | 12.5 | 9.7 | 12.3 |  |  | S |
|  | 5 | X5 | Y1 | Z1 | 13.6 | 7.1 | 12.7 |  |  | S |
|  | 6 | X6 | Y1 | Z1 | 13.4 | 6.4 | 8.5 |  |  | A |
|  | 7 | X7 | Y1 | Z1 | 13.0 | 6.7 | 9.7 | 4 | A | S |
|  | 8 | X8 | Y1 | Z1 | 13.9 | 7.7 | 13.4 |  |  | S |
|  | 9 | X9 | Y1 | Z1 | 11.9 | 8.7 | 13.7 |  |  | S |
|  | 10 | X10 | Y1 | Z1 | 12.0 | 8.0 | 10.1 |  |  | S |
|  | 11 | X11 | Y1 | Z1 | 11.3 | 10.1 | 14.8 |  |  | S |
|  | 12 | X12 | Y1 | Z1 | 10.9 | 9.4 | 14.1 |  |  | S |
|  | 13 | X13 | Y1 | Z1 | 9.9 | 16.4 | 20.4 |  |  | A |
|  | 14 | X14 | Y1 | Z1 | 10.2 | 19.3 | 21.3 |  |  | A |
|  | 15 | X15 | Y1 | Z1 | 13.7 | 7.3 | 15.1 |  |  | A |
|  | 16 | X16 | Y1 | Z1 | 12.9 | 6.9 | 14.1 |  |  | S |
|  | 17 | X17 | Y1 | Z1 | 13.0 | 7.8 | 13.4 |  |  | A |
|  | 18 | X18 | Y1 | Z1 | 8.7 | 9.9 | 12.9 |  |  | A |
|  | 19 | X19 | Y1 | Z1 | 11.6 | 8.5 | 16.9 |  |  | A |
|  | 20 | X20 | Y1 | Z1 | 11.1 | 9.0 | 15.3 |  |  | S |
|  | 21 | X21 | Y1 | Z1 | 11.5 | 9.9 | 14.4 |  |  | A |
|  | 22 | X22 | Y1 | Z1 | 11.6 | 7.0 | 12.5 |  |  | S |
|  | 23 | X23 | Y1 | Z1 | 12.7 | 7.0 | 14.4 |  |  | S |
|  | 24 | X24 | Y1 | Z1 | 11.2 | 8.1 | 14.6 |  |  | S |
|  | 25 | X25 | Y1 | Z1 | 11.5 | 6.2 | 8.7 |  |  | S |
|  | 26 | X26 | Y1 | Z1 | 10.6 | 12.3 | 15.3 |  |  | S |
|  | 27 | X27 | Y1 | Z1 | 13.6 | 17.9 | 21.3 |  |  | A |
|  | 28 | X28 | Y1 | Z1 | 12.9 | 8.7 | 11.6 |  |  | S |
|  | 29 | X29 | Y1 | Z1 | 11.5 | 6.0 | 8.1 |  |  | A |
|  | 30 | X30 | Y1 | Z1 | 13.7 | 7.1 | 12.3 |  |  | S |
|  | 31 | X31 | Y1 | Z1 | 17.6 | 10.1 | 14.1 |  |  | A |
|  | 32 | X7 | Y1 | Z2 | 14.8 | 8.2 | 11.0 |  |  | A |
|  | 33 | X7 | Y1 | Z3 | 10.3 | 5.5 | 7.1 |  |  | S |
|  | 34 | X7 | Y2 | Z1 | 9.9 | 5.2 | 7.3 |  |  | S |
|  | 35 | X7 | Y3 | Z1 | 7.2 | 3.8 | 5.3 | 5 | S | S |
| Comparative Example | 1 | X32 | Y1 | Z1 | 18.9 | 28.4 | 30.9 |  |  | A |
|  | 2 | X33 | Y1 | Z1 | 17.9 | 32.6 | 34.7 |  |  | C |
|  | 3 | X34 | Y1 | Z1 | 18.5 | 30.1 | 37.4 |  |  | C |
|  | 4 | X35 | Y1 | Z1 | 18.8 | 25.6 | 35.1 |  |  | A |
|  | 5 | X36 | Y1 | Z1 | 12.2 | 34.2 | 39.5 |  |  | B |
|  | 6 | X32 | Y1 | Z2 | 24.1 | 37.2 | 40.9 |  |  | A |
|  | 7 | X32 | Y1 | Z3 | 14.8 | 22.2 | 23.1 |  |  | A |
|  | 8 | X32 | Y2 | Z1 | 15.1 | 22.7 | 24.8 |  |  | A |

(Test Method)

Smoothness: Smoothness was evaluated based on the Wc values measured using "Wave Scan DOI" (trade name, produced by BYK Gardner Co.). The Wc value is an index of the amplitude of surface roughness at a wavelength of about 1 to 3 mm. A smaller measured value indicates a higher smoothness of the coated surface.

Distinctness of image: Distinctness of image was evaluated based on the Wb values measured using "Wave Scan DOI" (trade name, produced by BYK Gardner Co.). The Wb value is an index of the amplitude of surface roughness at a wavelength of about 0.3 to 1 mm. A smaller measured value indicates a higher distinctness of image of the coated surface.

Further, using the aqueous first colored coating composition (X) after storage, test panels were produced in the same manner as described above, and the distinctness of image was evaluated.

The term "initial" in the table indicates the distinctness of image when each aqueous first colored coating composition (X) was applied immediately after the production thereof, and the term "after storage" indicates the distinctness of image when each aqueous first colored coating composition (X) was applied after it was stored at 30° C. for 30 days after the production thereof.

Water resistance: The test plates were immersed in warm water at 40° C. for 240 hours, removed, and dried at 20° C. for 12 hours. Subsequently, cross-cuts reaching the substrate were made in the multilayer coating film on each test plate using a cutter to form a grid of 100 squares (2 mm×2 mm). Afterwards, adhesive cellophane tape was applied to the surface of the grid portion and abruptly peeled off at 20° C. The number of the remaining coating film squares was then examined.

S: 100 squares remained, and no small edge chipping of the coating film occurred at the edge of the cut made with the cutter.

A: 100 squares remained, but small edge chipping of the coating film occurred at the edge of the cut made with the cutter.

B: 90 to 99 squares remained.

C: The number of remaining squares was 89 or less.

Metallic feel (IV value): The IV value was measured using ALCOPE LMR-100 (produced by Kansai Paint Co., Ltd., surface shape measuring apparatus), and evaluated according to the following criteria.

The numerals shown in the table are as follows:
5: The IV value is 210 or more.
4: The IV value is 190 or more and less than 210.
3: The IV value is 170 or more and less than 190.
2: The IV value is 150 or more and less than 170.
1: The IV value is less than 140.

A larger numeral indicates superior metallic feel.

Metallic mottling: The test plates were each visually observed at different angles, and the coating appearance was evaluated according to the following criteria:

S: Almost no metallic mottling was observed, and the coating film had an extremely excellent appearance.

A: A small amount of metallic mottling was observed, but the coating film had an excellent appearance.

C: A considerable or significant amount of metallic mottling was observed, and the coating film had a poor appearance.

The invention claimed is:

1. A method for forming a multilayer coating film, comprising subjecting a substrate to the following steps (1) to (4) in order:

step (1): applying an aqueous first colored coating composition (X) to form a first colored coating film, step (2): applying an aqueous second colored coating composition (Y) to the first colored coating film formed in step (1) to form a second colored coating film, step (3): applying a clear coating composition (Z) to the second colored coating film formed in step (2) to form a clear coating film; and step (4): simultaneously bake-curing the first colored coating film, the second colored coating film, and the clear coating film formed in steps (1) to (3), wherein an aqueous coating composition comprising (A) a film-forming resin, (B) a phosphoric acid compound, and a pigment is applied as the aqueous first colored coating composition (X), the phosphoric acid compound being represented by the Formula:

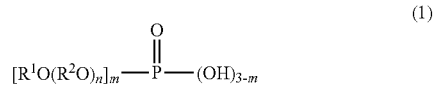

(1)

wherein m is 1 or 2, n is integer of 1 to 20, and $R^1$ is a substituted or unsubstituted hydrocarbon group having 2 to 20 carbon atoms, when m is 2, each $R^1$ may be the same or different, and $R^2$ is alkylene having 2 to 4 carbon atoms, when n is 2 or more, n oxyalkylene units ($R^2O$) may be the same or different, when m is 2, each $(R^2O)_n$ may be the same or different, and wherein the pigment consists of one or more selected from the group consisting of color pigments and extender pigments.

2. The method for forming a multilayer coating film according to claim 1, wherein the phosphoric acid compound (B) is a phosphoric acid compound represented by Formula (1) wherein n is an integer of 1 to 20.

3. The method for forming a multilayer coating film according to claim 1, wherein the phosphoric acid compound (B) is a phosphoric acid compound represented by Formula (1) wherein each oxyalkylene unit ($R^2O$) is an oxyethylene group.

4. The method for forming a multilayer coating film according to claim 1, wherein the phosphoric acid compound (B) is a phosphoric acid compound represented by Formula (1) wherein $R^1$ is a substituted or unsubstituted hydrocarbon group having 4 to 20 carbon atoms.

5. The method for forming a multilayer coating film according to claim 4, wherein the phosphoric acid compound (B) is a phosphoric acid compound represented by Formula (1) wherein $R^1$ is a substituted or unsubstituted hydrocarbon group having 7 to 20 carbon atoms.

6. The method for forming a multilayer coating film according to claim 1, wherein the phosphoric acid compound (B) is a phosphoric acid compound represented by Formula (1) wherein n is an integer of 1 to 20 and having an HLB of 3 to 17.

7. The method for forming a multilayer coating film according to claim 1, wherein the phosphoric acid compound (B) has a number average molecular weight of 100 to 3000.

8. The method for forming a multilayer coating film according to claim 1, wherein the aqueous first colored coating composition (X) further comprises a phosphoric acid compound represented by Formula (1')

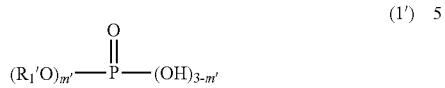

wherein m' is 1 or 2,
R$_1$' is a substituted or unsubstituted hydrocarbon group having 2 to 20 carbon atoms,
when m' is 2, each R$^{1'}$ may be the same or different.

9. The method for forming a multilayer coating film according to claim 1, wherein the aqueous first colored coating composition (X) further comprises a crosslinking agent (C).

10. The method for forming a multilayer coating film according to claim 1, wherein the film-forming resin (A) comprises acrylic resin particles (A1).

11. The method for forming a multilayer coating film according to claim 1, wherein the substrate is an electro-coated steel plate.

12. An aqueous first colored coating composition for use in the method for forming a multilayer coating film according to claim 1.

13. An article coated by the method for forming a multilayer coating film according to claim 1.

14. The method for forming a multilayer coating film according to claim 1, wherein R$^1$ is a substituted or unsubstituted hydrocarbon group having 2 to 11 carbon atoms.

* * * * *